US008991843B2

(12) United States Patent
Kraimer et al.

(10) Patent No.: US 8,991,843 B2
(45) **Date of Patent: *Mar. 31, 2015**

(54) MOVABLE STEP FOR A MATERIALS HANDLING VEHICLE

(75) Inventors: James V. Kraimer, Munich (DE); Jay G. Pollack, Sidney, OH (US); Markus Graf, Karlsfeld (DE)

(73) Assignee: Crown Equipment Corporation, New Bremen, OH (US)

( * ) Notice: Subject to any disclaimer, the term of this patent is extended or adjusted under 35 U.S.C. 154(b) by 865 days.

This patent is subject to a terminal disclaimer.

(21) Appl. No.: 12/730,290

(22) Filed: Mar. 24, 2010

(65) Prior Publication Data

US 2010/0171283 A1 Jul. 8, 2010

Related U.S. Application Data

(63) Continuation of application No. 11/556,318, filed on Nov. 3, 2006, now Pat. No. 7,740,259.

(60) Provisional application No. 60/765,230, filed on Feb. 3, 2006.

(51) Int. Cl.
*B60R 3/02* (2006.01)
*B66F 9/075* (2006.01)

(52) U.S. Cl.
CPC .................................. *B66F 9/07545* (2013.01)
USPC ........ 280/166; 280/748; 280/169; 280/164.1; 296/190.03; 296/190.11

(58) Field of Classification Search
USPC .......... 180/271, 286, 287; 280/748, 166, 169, 280/751, 163, 164.1; 296/190.01, 190.03, 296/190.08, 190.11
See application file for complete search history.

(56) References Cited

U.S. PATENT DOCUMENTS

| | | | | |
|---|---|---|---|---|
| 526,214 | A * | 9/1894 | Black | 105/440 |
| 2,354,178 | A | 7/1944 | Ulinski | |
| 2,913,062 | A | 11/1959 | Ulinski | |
| 3,265,158 | A | 8/1966 | Constable | |
| D222,694 | S | 12/1971 | Goodacre | |
| 3,656,578 | A | 4/1972 | Hemken | |
| 3,738,441 | A | 6/1973 | Kemner | |

(Continued)

FOREIGN PATENT DOCUMENTS

| | | |
|---|---|---|
| DE | 19730156 | 1/1999 |
| EP | 0570658 | 11/1993 |

(Continued)

OTHER PUBLICATIONS

Crown Specifications for Low Level Order Picker Series GPC 2000; VFS-GPC-05-GB; Sep. 2002; Germany.

(Continued)

*Primary Examiner* — J. Allen Shriver, II
*Assistant Examiner* — Bryan Evans
(74) *Attorney, Agent, or Firm* — Stevens & Showalter, LLP

(57) ABSTRACT

A materials handling vehicle is provided comprising a frame including an operator compartment having at least one entrance and a floorboard. The vehicle further comprises at least one step capable of being positioned across the entrance a spaced distance from the floorboard such that an operator may stand on the step when the step is positioned across the entrance to gain access to an elevated storage location.

21 Claims, 27 Drawing Sheets

(56) References Cited

U.S. PATENT DOCUMENTS

| | | | | |
|---|---|---|---|---|
| 3,784,247 | A | 1/1974 | Mills | |
| 4,116,296 | A | 9/1978 | Pleier et al. | |
| 4,310,193 | A | 1/1982 | Kolleas | |
| 4,317,500 | A | 3/1982 | Bening | |
| 4,336,860 | A | 6/1982 | Noller et al. | |
| 4,392,660 | A | 7/1983 | Mason et al. | |
| 4,397,371 | A | 8/1983 | Lynnes et al. | |
| 4,750,752 | A | 6/1988 | Furuta | |
| 4,840,248 | A | 6/1989 | Silverman | |
| 4,986,721 | A * | 1/1991 | Lowder et al. | 414/685 |
| 5,044,472 | A | 9/1991 | Dammeyer et al. | |
| 5,050,700 | A * | 9/1991 | Kim | 180/268 |
| RE34,194 | E | 3/1993 | Stowell et al. | |
| D373,887 | S | 9/1996 | Soederberg | |
| D373,888 | S | 9/1996 | Soederberg | |
| 5,984,040 | A | 11/1999 | Lee | |
| 6,113,142 | A | 9/2000 | Tolbert | |
| 6,137,398 | A | 10/2000 | Dunlap et al. | |
| 6,182,778 | B1 | 2/2001 | Henshaw et al. | |
| 6,189,964 | B1 | 2/2001 | Henshaw et al. | |
| 6,273,626 | B1 | 8/2001 | Yazawa | |
| 6,299,207 | B1 | 10/2001 | Bares | |
| 6,357,773 | B1 | 3/2002 | Griebel et al. | |
| 6,513,817 | B2 | 2/2003 | McCue et al. | |
| 6,595,306 | B2 | 7/2003 | Trego et al. | |
| 6,663,125 | B1 | 12/2003 | Cheng | |
| D492,833 | S | 7/2004 | Henshaw et al. | |
| 6,827,405 | B1 * | 12/2004 | Roberts | 297/411.23 |
| 6,902,024 | B2 | 6/2005 | Miiller et al. | |
| 6,948,739 | B2 | 9/2005 | Gallagher et al. | |
| 6,948,764 | B1 | 9/2005 | Haddock | |
| D539,503 | S | 3/2007 | Quinlan, Jr. et al. | |
| D542,005 | S | 5/2007 | Weiner et al. | |
| 7,267,369 | B2 | 9/2007 | Gallagher et al. | |
| D562,525 | S | 2/2008 | Graf et al. | |
| 2002/0081154 | A1 | 6/2002 | Herrick et al. | |
| 2002/0153718 | A1 | 10/2002 | Schneider | |
| 2004/0099461 | A1 * | 5/2004 | Miiller et al. | 180/272 |
| 2004/0099486 | A1 | 5/2004 | Gramatikov et al. | |
| 2005/0016782 | A1 | 1/2005 | Gallagher et al. | |
| 2005/0236197 | A1 | 10/2005 | Gallagher et al. | |
| 2007/0182121 | A1 | 8/2007 | Kraimer et al. | |
| 2007/0207024 | A1 | 9/2007 | Kraimer et al. | |

FOREIGN PATENT DOCUMENTS

| | | |
|---|---|---|
| EP | 1388518 | 2/2004 |
| JP | 06024274 | 2/1994 |
| JP | 6199181 | 7/1994 |
| JP | 6305363 | 11/1994 |
| JP | 2000143193 | 5/2000 |
| JP | 2000169094 | 6/2000 |
| JP | 2002145128 | 5/2002 |

OTHER PUBLICATIONS

Crown Specifications for Rider Pallet Trucks Series PR 3000; VFS-PR-02-GB; Aug. 1998; Germany.

Photo of a fold-down step.

Photo of a fixed step.

Crown specification brochure No. SF14641; Mar. 2006; entitled Crown TR 3600 Series, Tow Tractor; U.S.A.

Crown specification brochure No. GPC2000 SL BROCH; Jun. 2005; 30-M01353-006-00; entitled Crown 2000 Scissors Lift Series; Germany.

Crown specification brochure No. VFS-GPC-Tow-02-GB; Jun. 2003; entitled Crown GPC-Tow Series, Tow Tractor; Germany.

* cited by examiner

MOVABLE STEP FOR A MATERIALS HANDLING VEHICLE

REFERENCE TO RELATED APPLICATIONS

This application is a continuation of U.S. patent application Ser. No. 11/556,318, filed Nov. 3, 2006, and entitled "A MOVABLE STEP FOR A MATERIALS HANDLING VEHICLE," which claims the benefit of U.S. Provisional Patent Application Ser. No. 60/765,230, filed Feb. 3, 2006, and entitled "A MOVABLE STEP FOR A MATERIALS HANDLING VEHICLE," the entire disclosures of each of which are incorporated herein by reference.

BACKGROUND OF THE INVENTION

Materials handling vehicles comprising low level order pickers are known. Such a vehicle comprises a power unit, a battery compartment housing a battery, a load backrest, and a set of forks extending in a direction away from the load backrest. A walk-through operator compartment or platform is positioned between the battery compartment and the load backrest. An operator, when positioned within the operator compartment, may control the speed, braking and direction of the vehicle via a control handle structure.

It is known to place a fixed step on the backrest facing toward the operator compartment. It is also known to place a pivotable step on a wall of the battery compartment defining an inner wall of the operator compartment. The pivotable step is not positioned adjacent, i.e., at or very near, an outer peripheral edge of the vehicle. Nor does it extend to and engage the vehicle backrest.

An improved step arrangement is desired so as to allow an operator to more easily gain access to an elevated storage location.

SUMMARY OF THE INVENTION

In accordance with a first aspect of the present invention, a materials handling vehicle is provided comprising a frame including an operator compartment having at least one entrance and a floorboard. The vehicle further comprises at least one step capable of being positioned across the entrance a spaced distance from the floorboard such that an operator may stand on the step when the step is positioned across the entrance to gain access to an elevated storage location.

The step may be movable between a deployed position where the step is positioned across the entrance and a stowed position where the step is positioned in a location so as not to block the entrance into and exit from the operator compartment.

The step may be pivotable between the deployed and stowed positions.

The step may be in a down position when deployed and in an up position when stowed. A biasing element may be associated with the step for assisting an operator in moving the step from the down position to the up position.

The vehicle may further comprise a drive wheel coupled to the frame, a motor coupled to the drive wheel for effecting rotation of the drive wheel, a controller for controlling the operation of the drive motor, and a sensor associated with the step. The sensor may generate a signal to the controller when the step is in a travel state. Preferably, the controller provides a drive signal to the motor only when a travel state signal is being generated by the sensor.

The step may be positioned above the floorboard a distance of from about 250 mm to about 450 mm.

The operator compartment may comprise a walk-through operator compartment having first and second entrances. A first step may be positioned across the first entrance a spaced distance from the floorboard. A second step may be positioned across the second entrance a spaced distance from the floorboard. An operator may stand on one of the first and second steps when the one step is positioned across a corresponding one of the first and second entrances to gain access to the elevated storage location.

The first step may be movable between a deployed position where the first step is positioned across the first entrance and a stowed position where the first step is positioned in a location so as not to block the first entrance into the operator compartment. The second step may be movable between a deployed position where the second step is positioned across the second entrance and a stowed position where the second step is positioned in a location so as not to block the second entrance into the operator compartment.

In accordance with a second aspect of the present invention, a materials handling vehicle is provided comprising a frame including an operator compartment having at least one entrance and a floorboard, a drive wheel coupled to the frame, a motor coupled to the drive wheel for effecting rotation of the drive wheel, a controller for controlling the operation of the motor, at least one step associated with the frame, and at least one sensor associated with the step. The step is capable of being moved between a deployed position to allow an operator to stand on the step and gain access to an elevated storage location and a stowed position where the step is stored in an out-of-the-way location. The at least one sensor is preferably associated with the step so as to generate a signal to the controller when the step is in a travel state. The controller preferably provides a drive signal to the motor only when a travel state signal is being generated by the at least one sensor.

The step may slide between deployed and stowed positions. It is also contemplated that the step may be pivotable between the deployed and stowed positions.

The step may be in a down position when deployed and an up position when stowed. A biasing element may be provided for assisting an operator in moving the step from the down position to the up position.

The operator compartment may further comprise first and second walls. A stop may be coupled to the first wall. The step may be pivotably coupled at a first end to the second wall. A second end of the step may engage the stop when the step is moved to the down position. The first wall may comprise a backrest and the second wall may comprise a battery compartment wall. Alternatively, the first wall may comprise a battery compartment wall and the second wall may comprise a backrest.

A locking mechanism may be associated with the second wall for releasably locking the step in position when the step has been moved to the up position.

The step may comprise a camming surface. The sensor may comprise a microswitch which is actuated by the camming surface.

In another embodiment, the step comprises a flag and the sensor may comprise a proximity sensor which is actuated by the flag.

First and second steps may be provided. The first step may be moved between a deployed position to allow an operator to stand on the first step and gain access to an elevated storage location and a stowed position where the first step is stored in an out-of-the-way location. The second step may be moved between a deployed position to allow an operator to stand on the second step and gain access to an elevated storage location and a stowed position where the second step is stored in an out-of-the-way location.

DETAILED DESCRIPTION OF THE INVENTION

Figure 1:
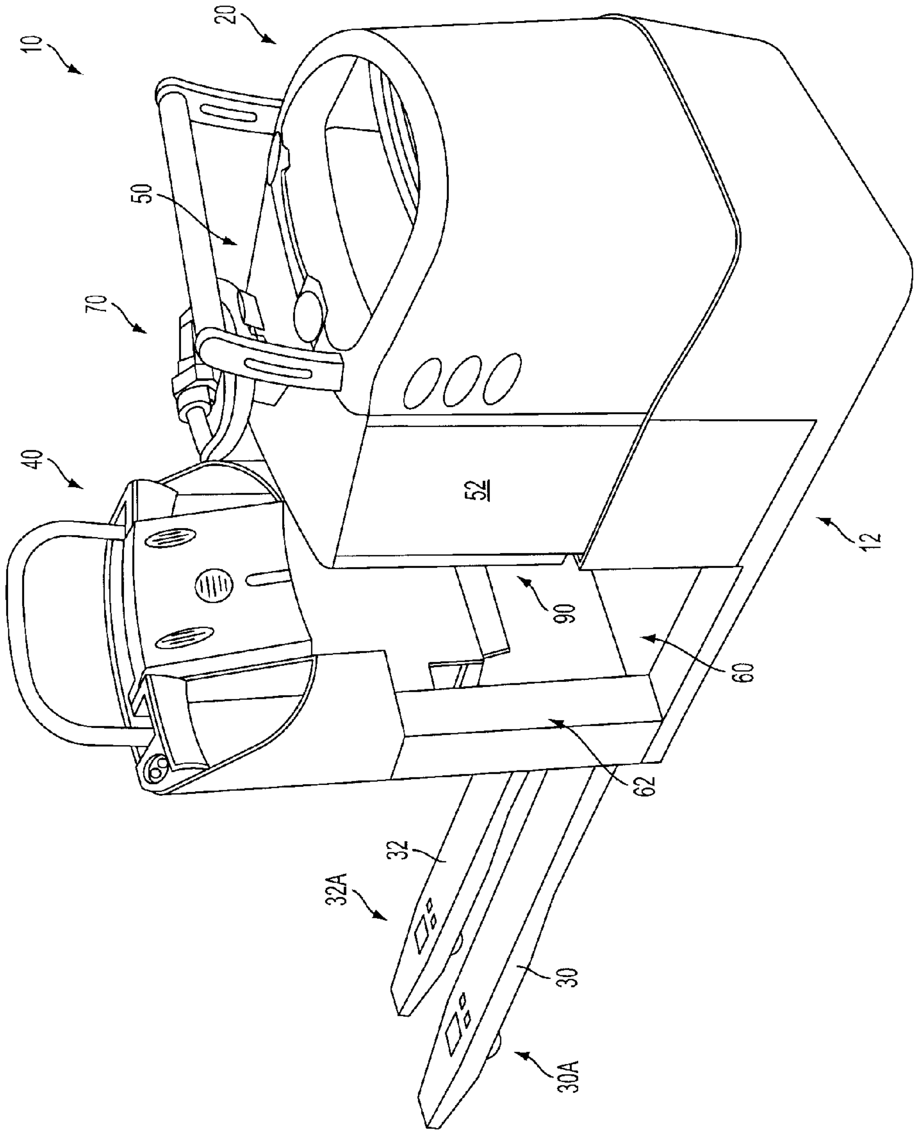
FIG. 1 is a perspective view of a materials handling vehicle and including first and second step assemblies (a stop for the second step assembly is not illustrated) constructed in accordance with a first embodiment of the present invention.
Figure 2:
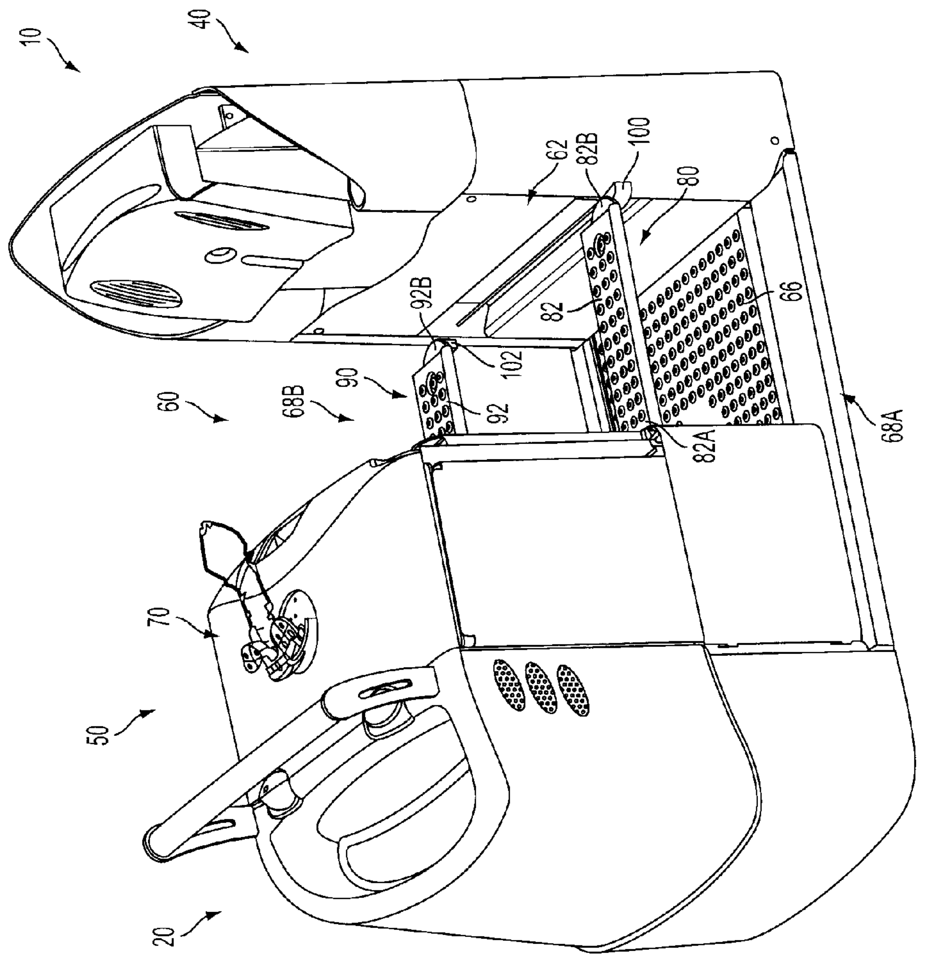
FIGS. 2 and 3 are perspective views of the materials handling vehicle of FIG. 1 with its forks removed and including the first and second step assemblies constructed in accordance with the first embodiment of the present invention.
Figure 3:
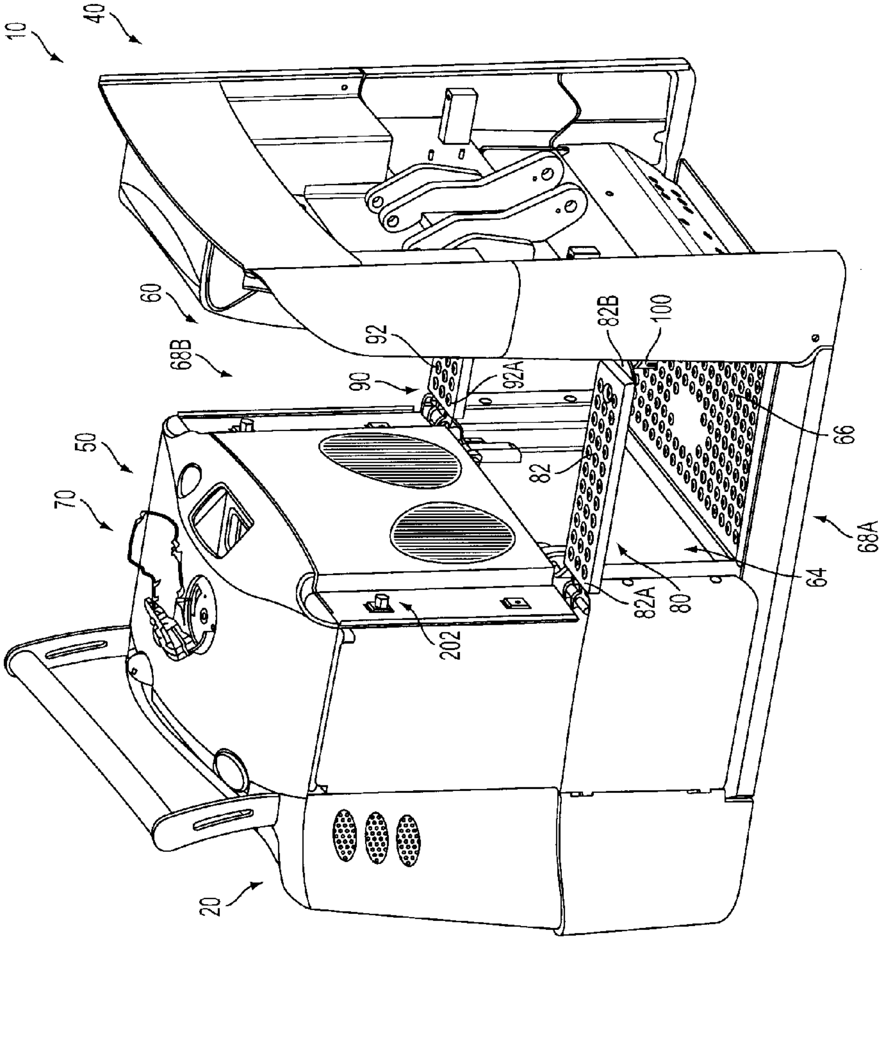
Figure 4:
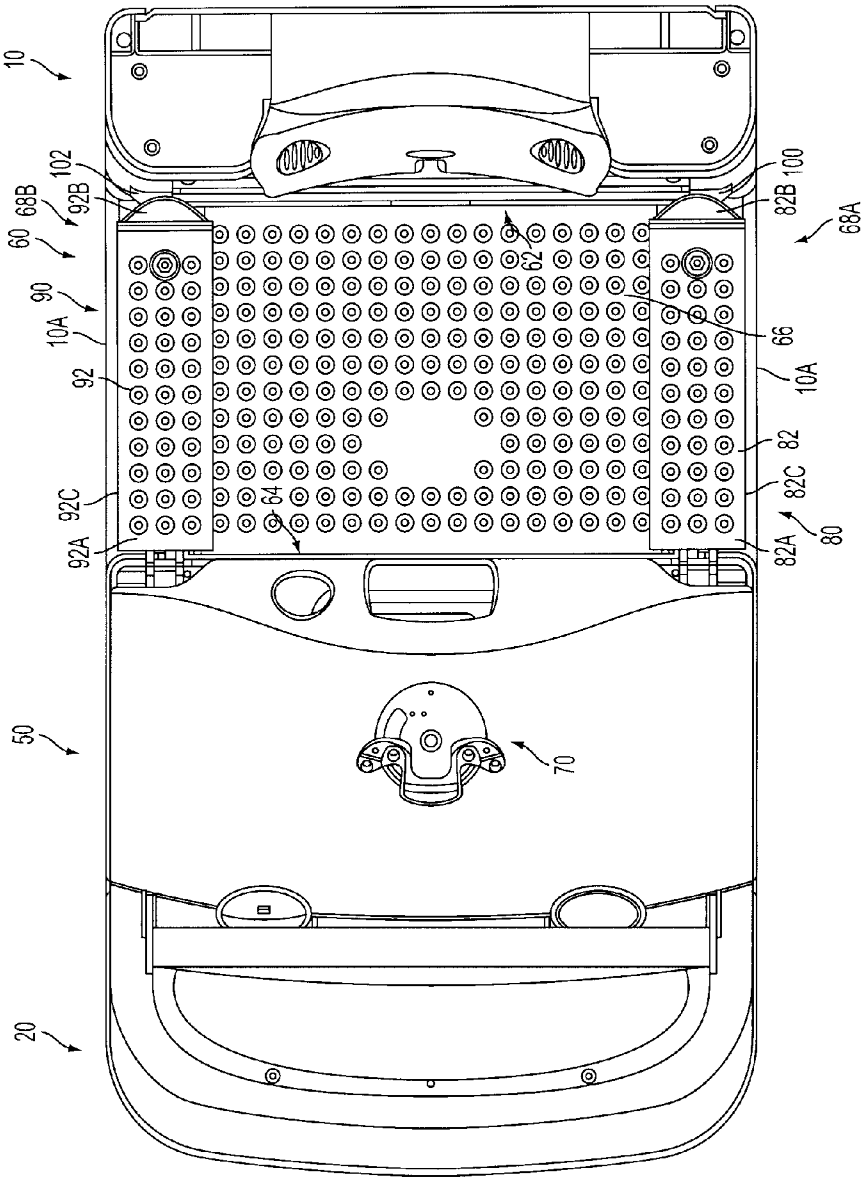
FIG. 4 is a top view of the vehicle illustrated in FIGS. 2 and 3.
Figure 5:
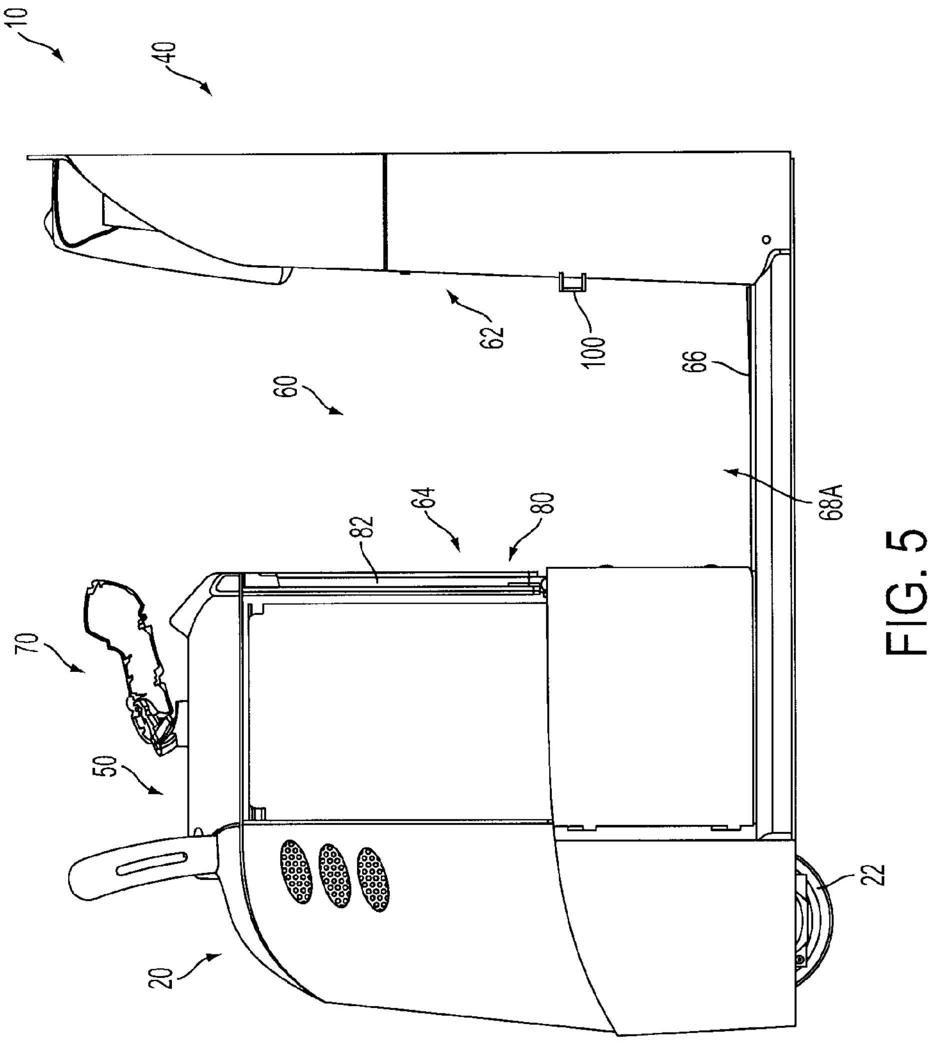
FIG. 5 is a side view of the vehicle illustrated in FIGS. 2 and 3 with the first and second steps in their stowed positions.
Figure 6:
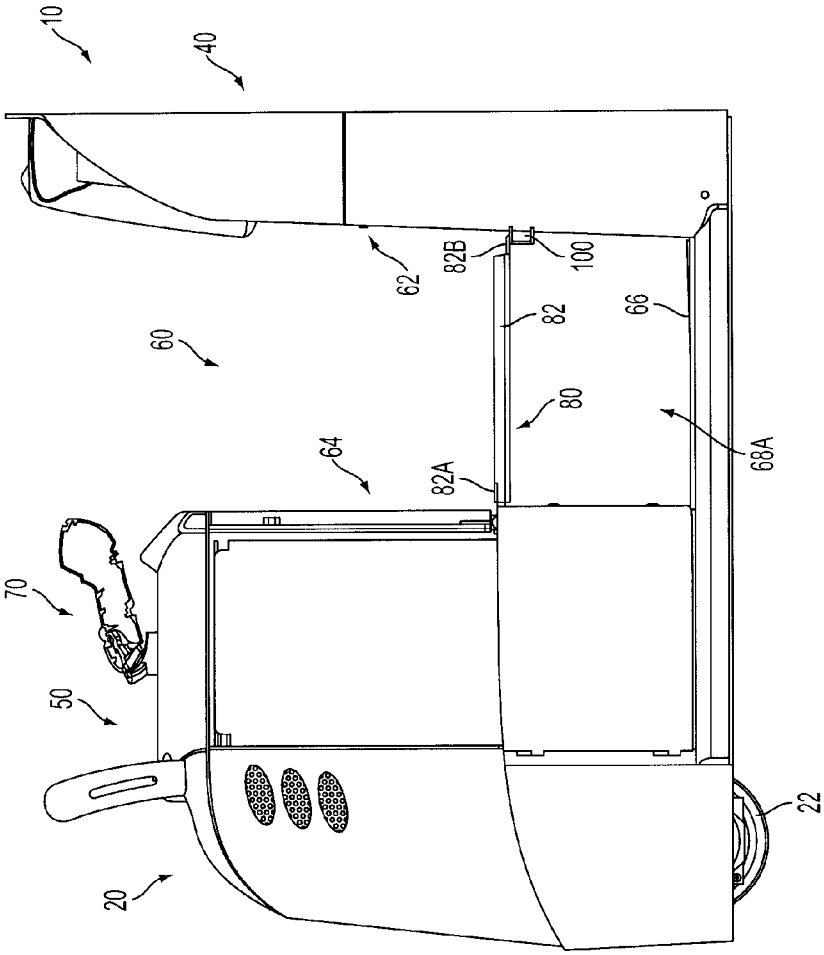
FIG. 6 is a side view of the vehicle illustrated in FIGS. 2 and 3 with the first step in its deployed position.
Figure 8:
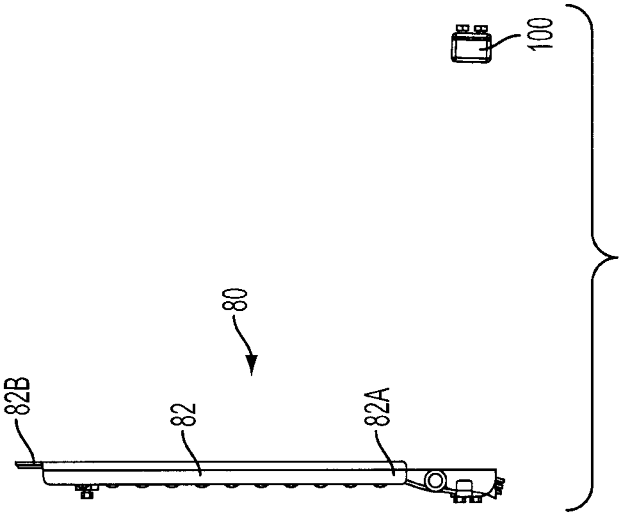
FIGS. 7 and 8 are side views of the first step assembly and its corresponding stop.
Figure 7:
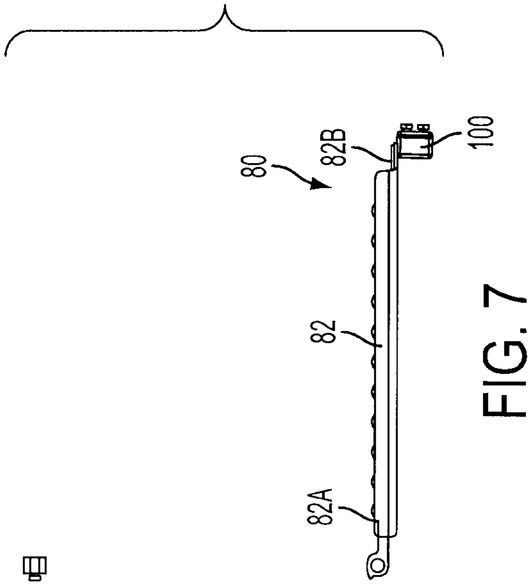
Figure 10:
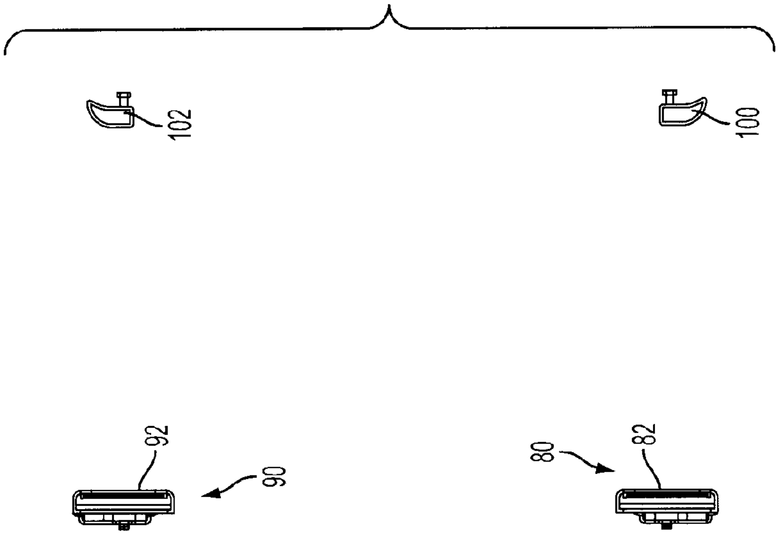
FIG. 10 is a top view of the first and second step assemblies and corresponding stops with the first and second steps in their stowed positions.
Figure 9:
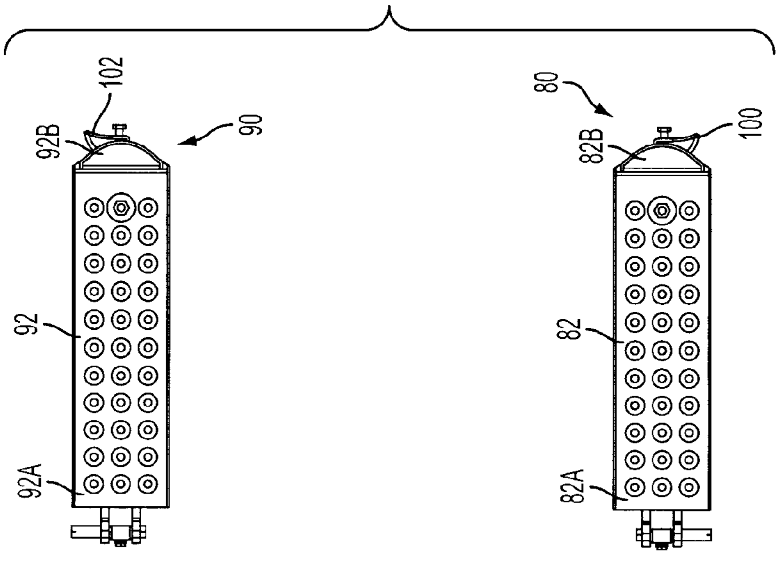
FIG. 9 is a top view of the first and second step assemblies and corresponding stops with the first and second steps in their deployed positions.
Figure 27:
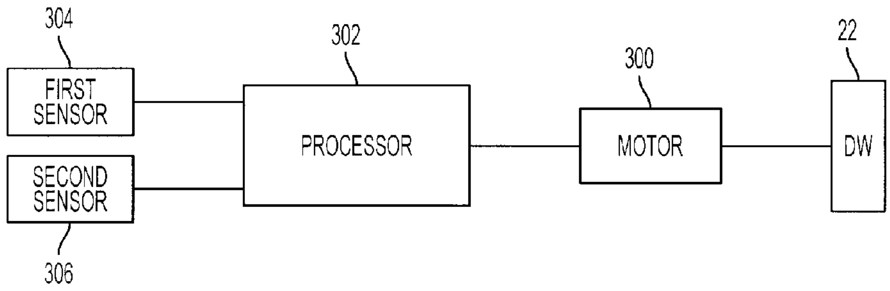
FIG. 27 is a schematic view of a vehicle drive wheel, a traction motor/brake assembly, a processor and the first and second microswitches, all assembled in accordance with a first embodiment of the present invention.

Referring now to FIG. 1, a materials handling vehicle comprising a low level order picker 10 is illustrated. The vehicle 10 comprises a frame 12 including a power unit 20 containing a traction motor/brake assembly 300 coupled to a drive wheel 22, see FIGS. 5, 6 and 27, for driving and braking the drive wheel 22. The drive wheel 22 is positioned below the power unit 20. A non-driven caster wheel (not shown) is also positioned below the power unit 20. A power steering motor (not shown) is provided in the power unit 20 for turning the drive wheel 22, i.e., to allow the vehicle 10 to be steered. A hydraulic pump/motor (not shown) is also housed within the power unit 20 for providing pressurized hydraulic fluid to a piston/cylinder unit (not shown) for raising and lowering first and second forks 30 and 32 relative to a load backrest 40. The load backrest 40 comprises part of the vehicle frame 12. The forks 30 and 32 are illustrated in FIG. 1 only. A load wheel assembly 30A, 32B is coupled to each fork 30, 32. The frame 12 further comprises a battery compartment 50 housing a battery 52. The battery compartment 50 is provided adjacent the power unit 20. The battery 52 provides power to the traction motor/brake assembly, the power steering motor, and the hydraulic pump/motor. The frame 12 also includes a walk-through operator compartment 60, which is positioned between the battery compartment 50 and the load backrest 40. An operator, when positioned within the operator compartment 60, may control the speed, braking and direction of the vehicle 10 and the height of the forks 30 via a control handle structure 70.

The walk-through operator compartment 60 may comprise opposing first and second walls 62 and 64 and a floorboard 66, see FIGS. 1-6. The walk-through operator compartment 60 further comprises first and second entrances 68A and 68B through which an operator can enter and exit the operator compartment 60, see FIGS. 2-6.

The vehicle 10 further comprises, in accordance with a first embodiment of the present invention, first and second step assemblies 80 and 90 and first and second stops 100 and 102 (the stops are not illustrated in FIG. 1), see FIGS. 2-10. The first step assembly 80 comprises a first step 82 capable of being pivoted between a deployed positioned where the step 82 is positioned across the first entrance 68A, see FIGS. 2-4 and 6, and a stowed position, where the first step 82 is positioned in a location so as not to block the first entrance 68A into the operator compartment 60, see FIG. 5. When in the deployed position, a second end 82B of the step 82, opposite a first end 82A of the step 82, engages or rests upon the stop 100. The stop 100 is bolted to or otherwise coupled to the first wall 62 at a location on the first wall 62 such that the step 82 is located in a generally horizontal plane. The second step assembly 90 comprises a second step 92 capable of being pivoted between a deployed positioned where the step 92 is positioned across the second entrance 68B, see FIGS. 2-4, and a stowed position, where the second step 92 is positioned in a location so as not to block the second entrance 68B into the operator compartment 60, see FIG. 5. When in the deployed position, a second end 92B of the step 92, opposite a first end 92A of the step 92, engages or rests upon the stop 102. The stop 102 is bolted to or otherwise coupled to the first wall 62 at a location on the first wall 62 such that the step 92 is located in a generally horizontal plane. When the first and second steps 82 and 92 are positioned in their down or deployed positions, they may be positioned above the floorboard 66 a distance of from about 250 mm to about 450 mm. As best viewed in FIG. 4, outer edges 82C and 92C of the first and second steps 82 and 92 are positioned just adjacent to an outer peripheral edge 10A of the vehicle 10. When the first step 82 is in its deployed position, an operator may stand on the step 82 to gain access to an elevated storage location. Likewise, when the second step 92 is in its deployed position, an operator may stand on the step 92 to gain access to an elevated storage location.

Figure 16:
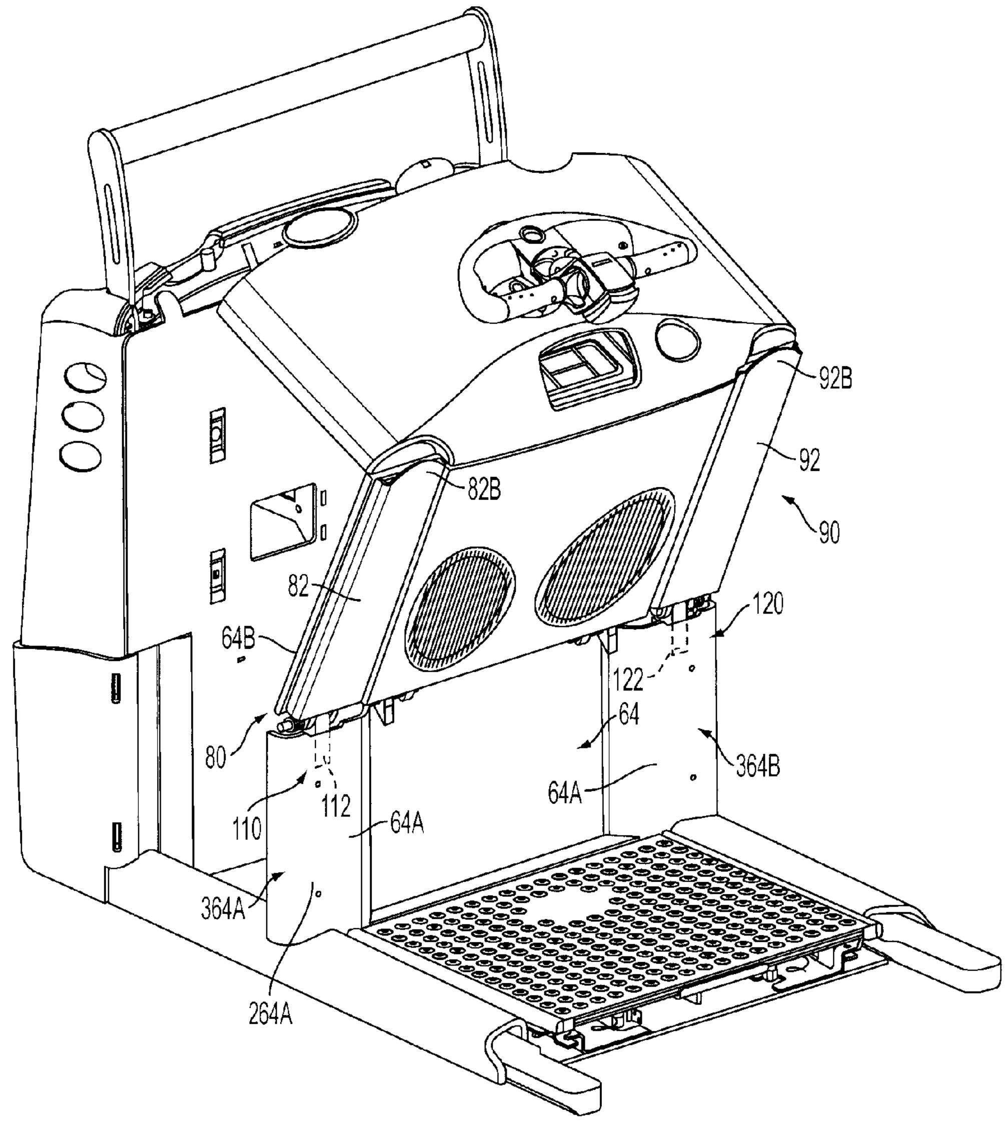
FIG. 16 is a view of the second wall of the vehicle illustrating upper and base portions of the second wall, wherein the upper portion pivots relative to the base portion.
Figure 17:
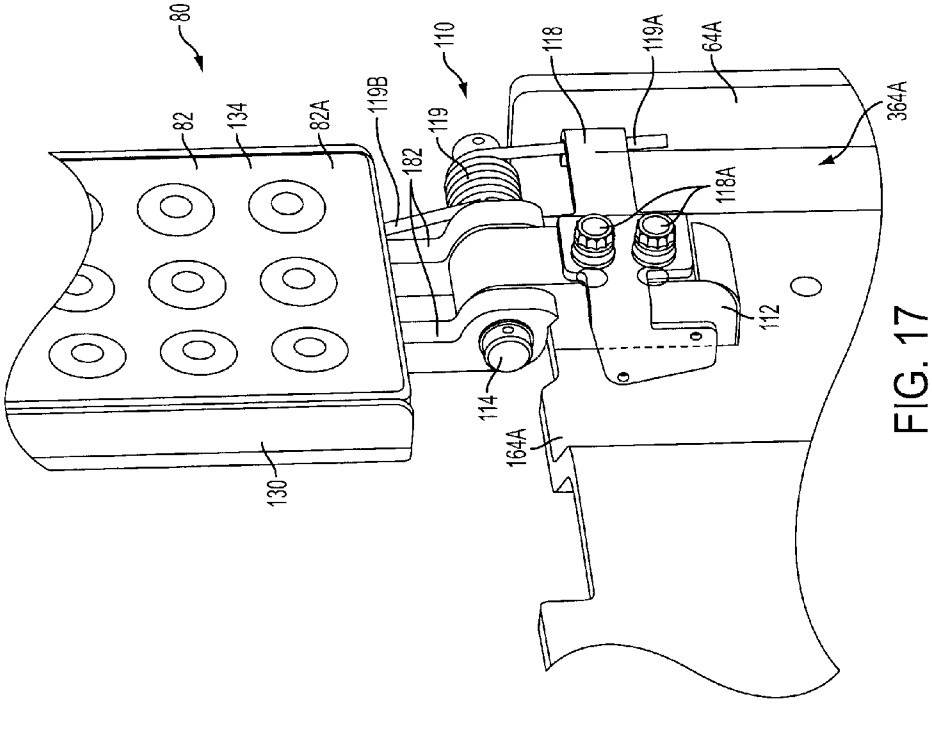
FIGS. 17 and 18 are perspective views of a first hinge mechanism of the first step assembly.

The first step assembly 80 further comprises a first hinge mechanism 110 for coupling the step 82 to a base portion 64A of the second wall 64, see FIGS. 16 and 17. The second step assembly 90 further comprises a second hinge mechanism 120 for coupling the step 92 to the base portion 64A of the second wall 64, see FIG. 16. The second wall 64 defines one wall of the battery compartment 50. In the illustrated embodiment, the hinge mechanisms 110 and 120 are not coupled to an upper portion 64B of the second wall. It is also contemplated that the second wall 64 may comprise a single portion; hence, the wall 64 would not include separate base and upper portions 64A and 64B but instead would include only a single portion.

Figure 11A:
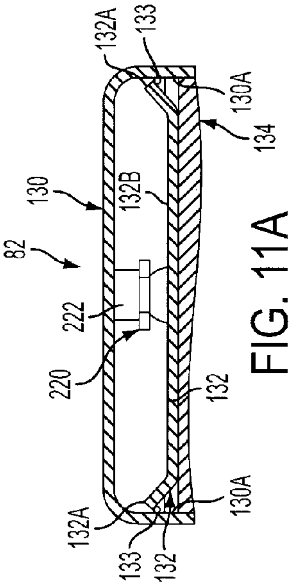
FIG. 11A is a view taken along view line 11A-11A in FIG. 11.
Figure 11B:
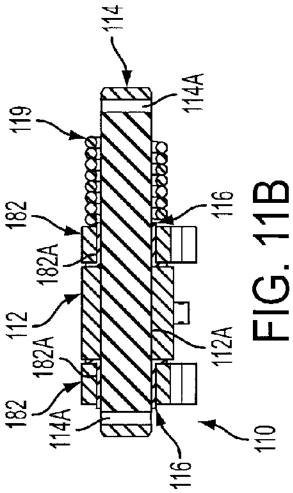
FIG. 11B is a view taken along view line 11B-11B in FIG. 11.
Figure 11:
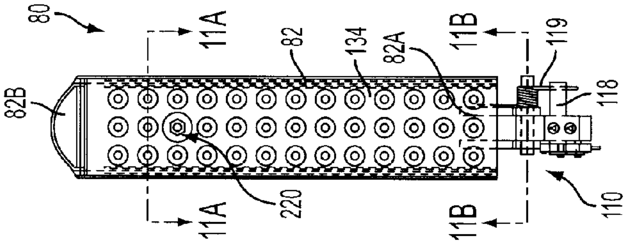
FIG. 11 is a front view of the first step assembly.
Figure 20:
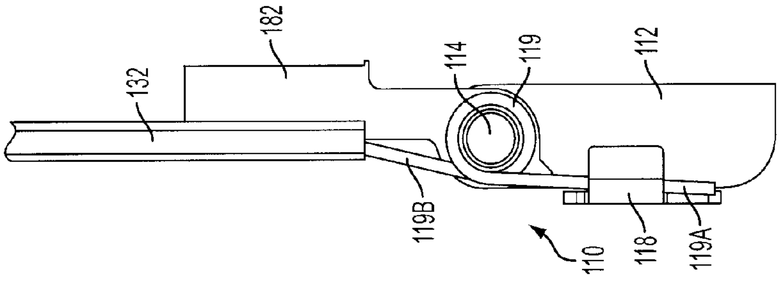
FIG. 20 is a side view of the first hinge mechanism illustrated in FIGS. 17 and 18.
Figure 19:
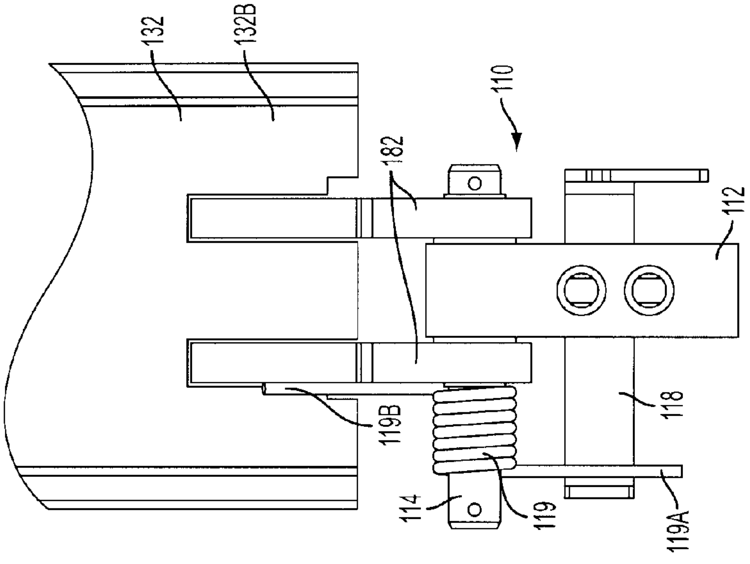
FIG. 19 is a rear view of the first hinge mechanism illustrated in FIGS. 17 and 18.
Figure 18:
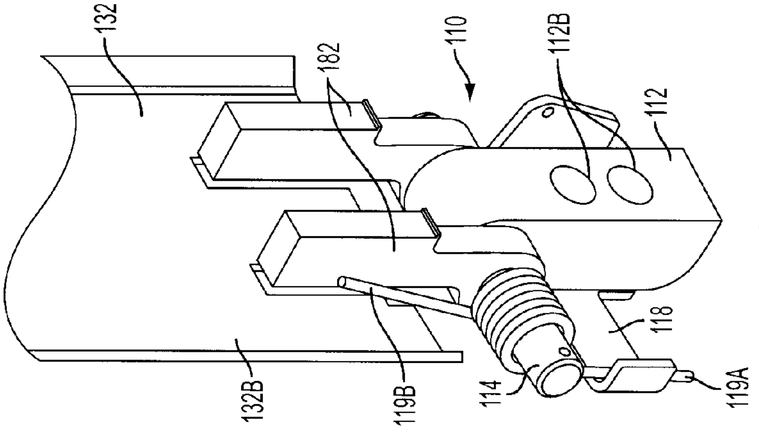
Figure 22:
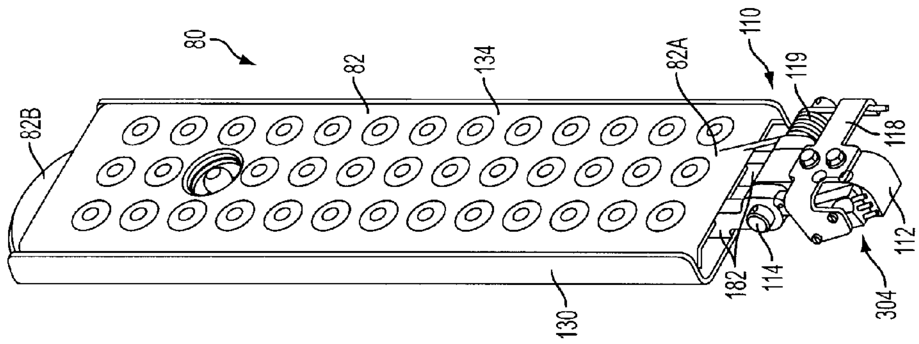
FIGS. 21 and 22 are perspective views of the first step assembly and a first microswitch.
Figure 21:
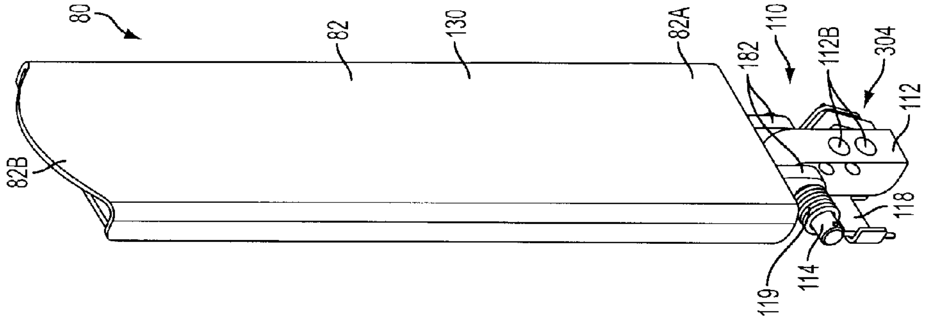

The first step 82 comprises an outer channel 130 and an inner step plate 132 coupled together via one or more welds 133 located along outer edges 132A of the step plate 132 and inner edges 130A of the outer channel 130, see FIG. 11A. A polymeric sheet or mat 134 formed, for example, from synthetic rubber, is positioned over the inner step plate 132, see FIGS. 11, 11A, 17 and 22. The mat 134 is coupled to the inner plate 132 via adhesive, bolts or other like fastening mechanisms. A pair of connector arms 182, each provided with a bore 182A, see FIG. 11B, are weldably connected to the outer channel 130, see FIG. 22. The outer channel 130 is not shown in FIGS. 18, 19 and 20.

The first hinge mechanism 110 comprises a main attachment block 112 welded or otherwise coupled to an inner surface 164A of the second wall base portion 64A near a first outer edge section 364A of the second wall base portion 64A, see FIGS. 16 and 17. The inner surface 164A is opposite an outer surface 264A, which faces the operator compartment 60, see FIG. 16. A pivot shaft 114 extends through the bores 182A in the step connector arms 182 and a bore 112A provided in the main attachment block 112, see FIG. 11B. Pins (not shown) may be provided in bores 114A in the shaft 114 to maintain the shaft 114 in position relative to the connector arms 182 and the main block 112. First and second of bushings 116 are positioned on the shaft 114 and extend through the bores 182A in the connector arms 182. A spring-engagement bracket 118 is coupled to the main attachment block 112 via a pair of bolts 118A which are threadedly received in openings 112B in the attachment block 112, see FIGS. 11 and 17-22. A torsion spring 119 is positioned about the shaft 114, see FIGS. 11, 11B and 17-22. The spring 119 is not illustrated in FIGS. 23-26. A first end 119A of the torsion spring 119 engages the bracket 118, while a second end 119B of the torsion spring 119 engages the step 82; more specifically, an inner surface 132B of the step plate 132, see FIGS. 11A and 17-20. The first hinge mechanism 110 allows the first step 82 to pivot between its down or deployed position where the step 82 is positioned across the first entrance 68A, see FIGS. 2-4 and 6, and its up or stowed position, where the first step 82 is positioned in a location so as not to block the first entrance 68A into the operator compartment 60, see FIG. 5. The spring 119 defines a biasing element for assisting an operator in moving the step 82 from its down or deployed position to its up or stowed position.

Figure 22A:
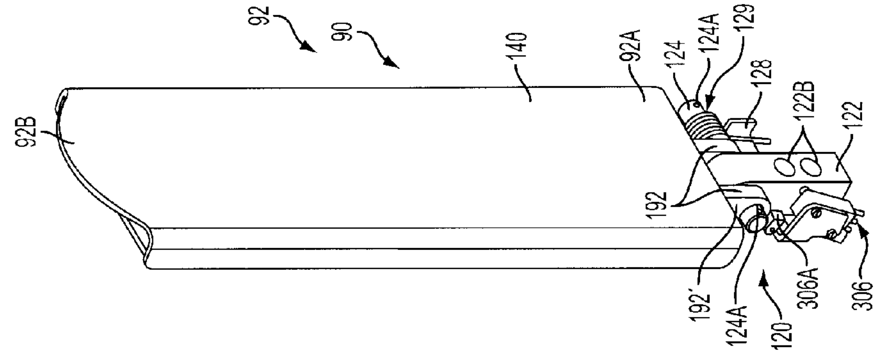
FIGS. 21A and 22A are perspective views of the second step assembly and a second microswitch.
Figure 21A:
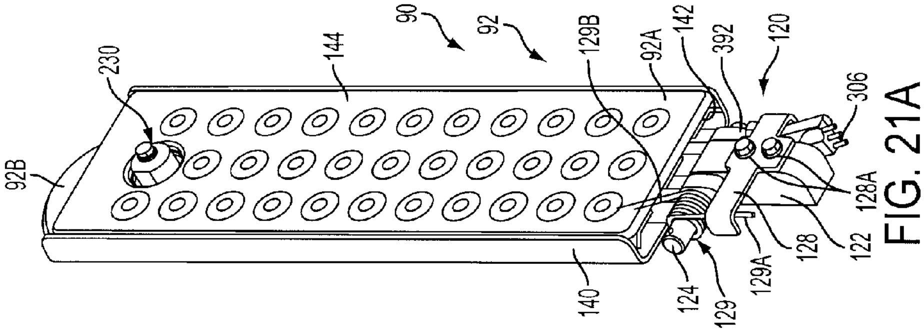
Figure 23:
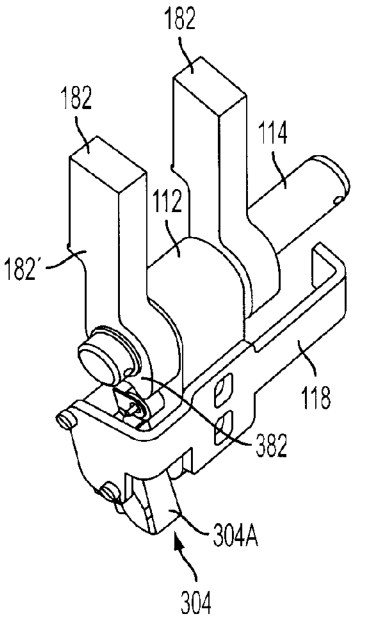
FIGS. 23 and 24 are perspective views illustrating a camming surface of a first arm and the first microswitch.

The second step 92 comprises an outer channel 140 and an inner step plate 142, see FIGS. 21A and 22A, coupled together via one or more welds located along outer edges of the step plate 142 and inner edges of the outer channel 140. A polymeric sheet or mat 144 formed, for example, from synthetic rubber, is positioned over the inner step plate 142. The mat 144 is coupled to the inner plate 142 via adhesive, bolts or other like fastening mechanisms. A pair of connector arms 192, each provided with a bore, are weldably connected to the outer channel 140.

The second hinge mechanism 120 comprises a main attachment block 122 welded or otherwise coupled to the inner surface 164A of the second wall base portion 64A near a second outer edge section 364B of the second wall base portion 64A, see FIG. 16. A pivot shaft 124 extends through the bores in the step connector arms 192 and a bore provided in the main attachment block 122, see FIGS. 21A and 22A. Pins (not shown) may be provided in bores 124A in the shaft 124 to maintain the shaft 124 in position relative to the connector arms 192 and the main block 122. A pair of bushings (not shown) is positioned on the shaft 124 and extend through the bores in the connector arms 192. A spring-engagement bracket 128 is coupled to the main attachment block 122 via a pair of bolts 128A which are threadedly received in openings 122B in the attachment block 122. A torsion spring 129 is positioned about the shaft 124. A first end 129A of the torsion spring 129 engages the bracket 128, while a second end 129B of the torsion spring 129 engages the step 92; more specifically, an inner surface of the step plate 142. The second hinge mechanism 120 allows the second step 92 to pivot between its down or deployed position where the step 92 is positioned across the second entrance 68B, see FIGS. 2-4, and its up or stowed position, where the second step 92 is positioned in a location so as not to block the second entrance 68B into the operator compartment 60, see FIG. 5. The spring 129 defines a biasing element for assisting an operator in moving the step 92 from its down or deployed position to its up or stowed position.

Figure 13A:
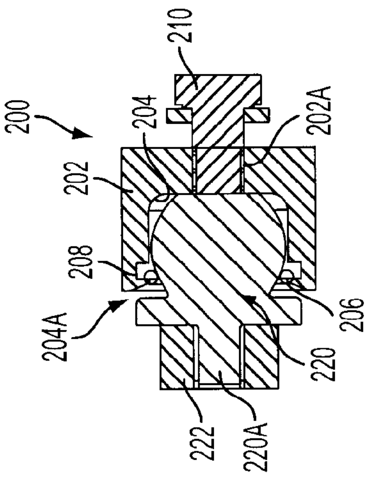
FIG. 13A is a view taken along view line 13A-13A in FIG. 13.
Figure 13:
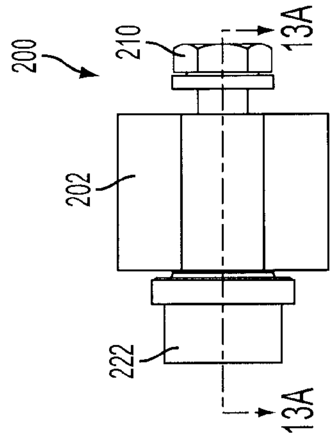
FIG. 13 is a side view of the first locking mechanism illustrated in FIG. 12.
Figure 12:
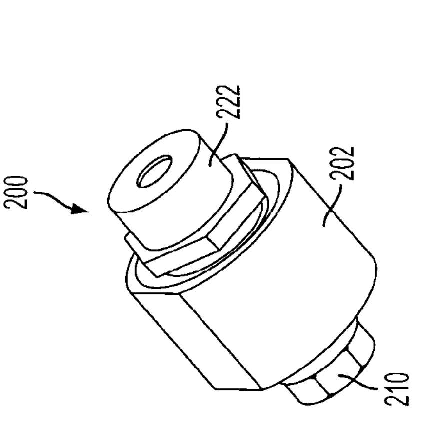
FIG. 12 is a perspective view of a first locking mechanism.

A first locking mechanism 200 is provided for releasably locking the first step 82 in its up or stowed position, see FIGS. 12, 13 and 13A. A second locking mechanism 230 is provided for releasably locking the second step 92 in its up or stowed position, see FIG. 21A. The second locking mechanism 230 is constructed in the same manner as the first locking mechanism 200. Hence, only the first locking mechanism 200 will be described herein in detail. However, one skilled in the art will understand that the second locking mechanism 230 may be constructed in accordance with the description herein of the first locking mechanism 200.

Figure 14:
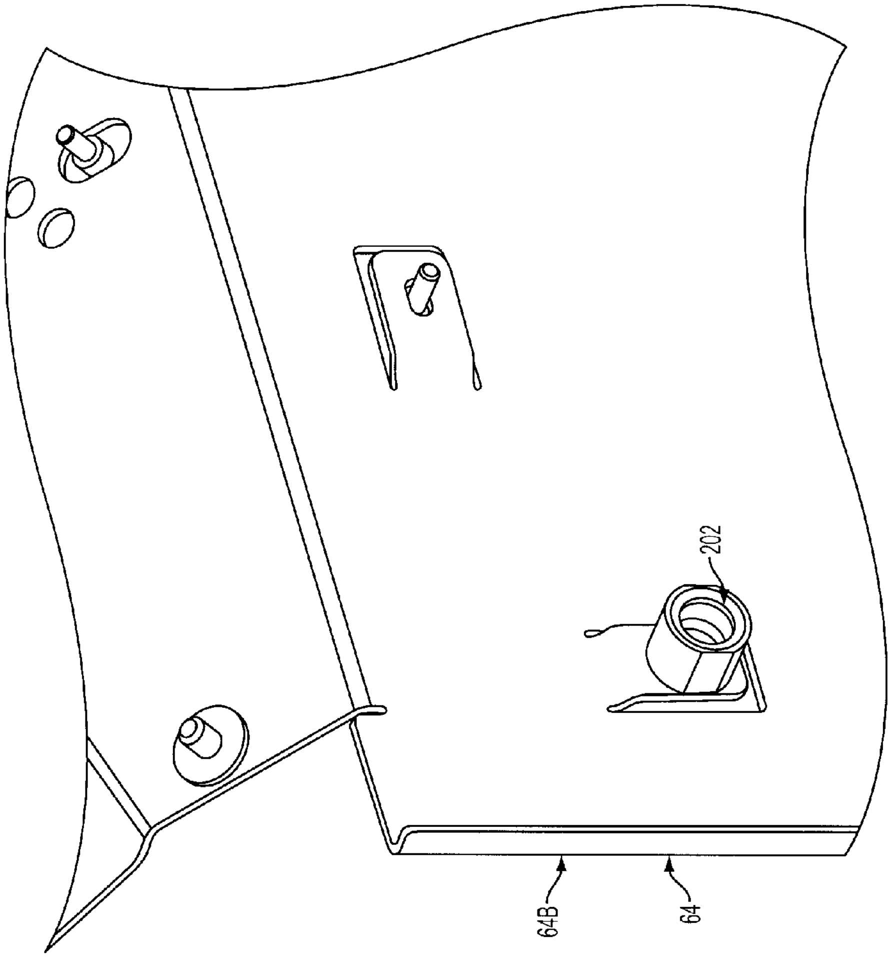
FIG. 14 is a perspective view of an upper portion of a second wall of the vehicle including a female portion of the first locking mechanism.
Figure 15:
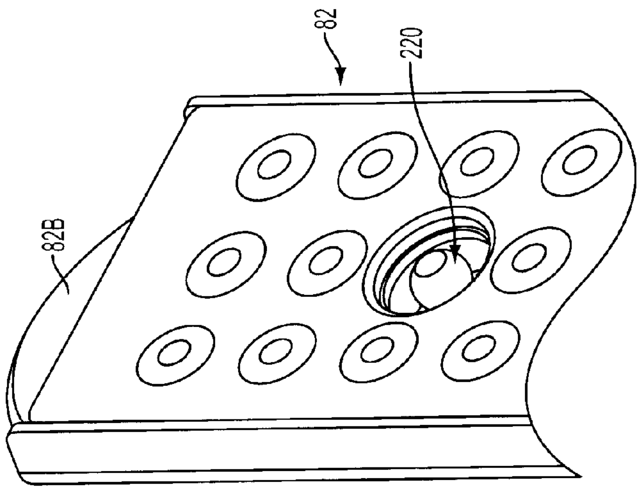
FIG. 15 is a perspective view of a portion of the first step including a male portion of the first locking mechanism.

The first locking mechanism 200 comprises a female portion 202 having an inner cavity 204 with a spring 206 mounted in a recess 208 at an entrance 204A into the inner cavity 204, see FIGS. 12, 13 and 13A. The female portion 202 is coupled to the upper portion 64B of the second wall 64 via a bolt 210 passing through a bore in the second wall upper portion 64B and threadedly engaging a bore 202A in the female portion 202, see FIGS. 13A and 14. The first locking mechanism 200 further comprises a male portion 220 coupled to the outer channel 130 of the step 82, see FIGS. 11A, 12, 13, 13A and 15. A nut 222 is threaded onto a shaft 220A of the male portion 220, see FIG. 13A. The nut 222, in turn, is welded to the outer channel 130 of the step 82, see FIG. 11A. When the first step 82 is moved to a nearly vertically position, an operator may apply a force against the step 82 in a direction toward the female portion 202 sufficient to move the step 82 to a generally vertical position and also causing the male portion 220 of the first locking mechanism 200 to pass through the spring 206 and enter into the inner cavity 204 of the female portion 202, see FIG. 13A. The spring 206 retains the male portion 220 in the inner cavity 204 until an operator applies a force against the step 82 in a direction away from the female portion 202 sufficient to cause the male portion 220 to exit the inner cavity 204 and, hence, allow the step 82 to be manually pivoted downward to its deployed positioned, see FIG. 2.

In place of the female and male portions 202 and 220, it is contemplated that other releasable locking mechanisms such as one or more magnets may be used.

Figure 24:
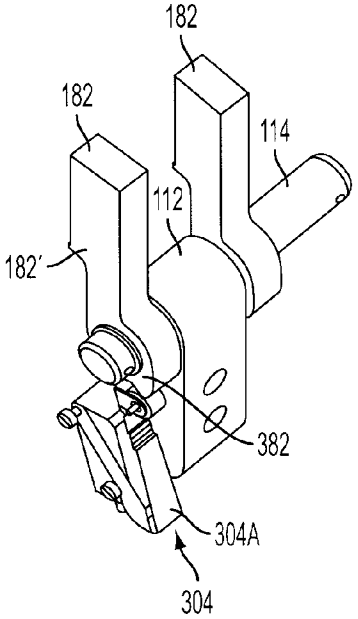
Figure 25:
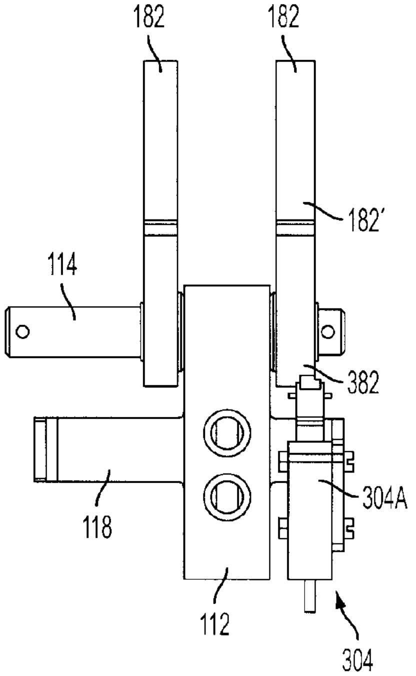
FIGS. 25 and 26 are front and side views respectively of the camming surface and the first microswitch illustrated in FIGS. 23 and 24.
Figure 26:
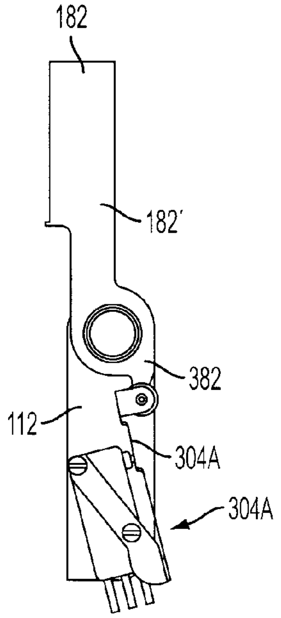

As noted above, a traction motor/brake assembly 300 is coupled to the vehicle drive wheel 22 for driving and braking the drive wheel 22. A controller 302 controls the operation of the fraction motor/brake assembly 300, see FIG. 27. First and second sensors associated with the first and second steps 82 and 92, respectively, comprising first and second microswitches 304 and 306 in this illustrated embodiment, are coupled to the controller 302, see FIG. 27. The first microswitch 304 is also coupled to the spring-engagement bracket 118, see FIGS. 21-23 and 25, while the second microswitch 306 is also coupled to the spring-engagement bracket 128, see FIGS. 21A and 22A. In FIGS. 24 and 26, the first microswitch 304 is illustrated but the bracket 118 is not.

A first arm 182' of the first step connector arms 182 is provided with a camming surface 382, see FIGS. 23-26. When the first step 82 is located in its stowed position, see FIG. 5, the camming surface 382 engages a spring-biased control arm 304A, forming part of the first microswitch 304, causing the microswitch 304 to be actuated. When actuated, the microswitch 304 generates a signal to the controller 302 indicating that the first step 82 is in a travel state, i.e., the step 82 is in its stowed position in this illustrated embodiment. However, when the step 82 is rotated counter-clockwise approximately 1 degree from vertical, the camming surface 382 releases the control arm 304A a sufficient amount to cause the microswitch 304 to be deactuated. When the microswitch 304 is deactuated, it generates a signal to the controller 302 that the first step 82 is no longer in a travel state.

A second arm 192' of the second step connector arms 192 is provided with a camming surface 392, see FIGS. 21A and 22A. When the second step 92 is located in its stowed position, the camming surface 392 engages a spring-biased control arm 306A, forming part of the second microswitch 306, causing the microswitch 306 to be actuated. When actuated, the microswitch 306 generates a signal to the controller 302 indicating that the second step 92 is in a travel state, i.e., the step 92 is in its stowed position in this illustrated embodiment. However, when the step 92 is rotated counter-clockwise approximately 1 degree from vertical, the camming surface 392 releases the control arm 306A a sufficient amount to cause the microswitch 306 to be deactuated. When the microswitch 306 is deactuated, it generates a signal to the controller 302 that the second step 92 is no longer in a travel state.

The controller 302, in response to operator commands, generates drive signals to the traction motor/brake assembly 300 to drive or effect rotation of the wheel 22 only when it receives signals from both the first and second microswitches 304 and 306 indicating that the steps 82 and 92 are in their travel states, i.e., are in their stowed positions in this illustrated embodiment. However, if the controller 302 receives a signal from the first microswitch 304 that the first step 82 is no longer in a travel state or a signal from the second microswitch 306 that the second step 92 is no longer in a travel state, the controller 302 does not generate a drive signal to the traction motor/brake assembly 300, i.e., the controller 302 will only permit the traction motor/brake assembly 300 to brake the wheel 22 but will not permit the traction motor/brake assembly 300 to effect rotation of the wheel 22. When the controller 302 receives a signal from the first microswitch 304 that the first step 82 is no longer in a travel state or a signal from the second microswitch 306 that the second step 92 is no longer in a travel state, it may be preferred for the controller 302 to cause the traction motor/brake assembly 300 to brake the wheel 22.

While the microswitches 304 and 306 have been used as the first and second sensors of the illustrated embodiment, it will be apparent to those skilled in the art from this description that Hall Effect devices, other proximity sensors and/or other devices positioned at other locations relative to the steps 82 and 92, such as near the second ends 82B and 92B of the steps 82 and 92, may be used as the first and second sensors for the present invention.

While not shown in the drawings, it is contemplated that the first and second steps 82 and 92 may slide between deployed and stowed positions. It is also contemplated, that the first and second steps 82 and 92 may be rotated from a horizontal position to a vertical position before being moved into a storage pocket so as to be stowed in a vertical position. After being pulled out of the storage pocket to be deployed, each step 82, 92 is rotated from its vertical position to its horizontal position.

Alternate control arrangements may be preferred in given applications. For example, it may be desirable to enable an operator to travel with a step 82, 92 in its lowered, deployed position if a series of picks were to be performed from a series of elevated storage locations. To accomplish such operation, a sensor can be placed in the step, placed in the stop that supports the step or otherwise be associated with the step so that when the step is deployed the sensor would be activated. Thus, the truck would be enabled to travel when the step is stowed or deployed but not when the step is any position between its stowed and deployed positions.

For this mode of operation, it may also be desirable to prevent travel if an operator is using the step. Thus, while the sensor would indicate that the step is deployed, that sensor or another sensor would also indicate if the step is in use, i.e., an operator is standing or otherwise engaging the step with a predefined force, for example by resting a foot on the step, sitting on the step, resting a package or other object on the step and the like. If the step is indicated as being in use, truck travel is not allowed.

A single sensor can be used to provide a first signal when the step is deployed, i.e., a force is generated by the weight of the step but no other force is applied to the step, and to provide a second signal if the step is deployed and in use as indicated by a force above a given threshold force, i.e., some force above the weight of the step alone, is being applied to the sensor. For example, the sensor could comprise a three position switch that closes (or opens) on contact in response to the weight of a deployed step to generate the first signal and closes (or opens) a second contact in response to an increased weight to generate the second signal.

In this embodiment, a "travel state" is generated when the step is in its deployed position as indicated by the first signal but not when the step is in use as indicated by the second signal. For this embodiment, the step stowed sensor can also be used so that the "travel state" is also generated when the step is stowed.

Alternately, a sensor can be positioned in the step, for example, a device such as a weight sensing piezoelectric element or the like can be incorporated into the step to sense deflection of the step with deflection created by deployment of the step generating the first signal and further deflection created by additional weight being applied to the step beyond a given point corresponding to a predetermined force applied to the step such as a force that would be created by an operator resting a foot or standing on the step, generating the second signal. A pressure sensor mounted on the upward facing surface of the step under the step mat can be used to generate the second signal in response to pressure applied to the upward surface of the step, for example by an operator standing on the step mat.

Here again, a "travel state" is generated when the step is in its deployed position as indicated by the first signal but not when the step is in use as indicated by the second signal. For this embodiment, the step stowed sensor can also be used so that the "travel state" is also generated when the step is stowed.

Also, one or more sensors sensitive to weight can be positioned at a hinge mechanism 110, 120 of a step 82, 92.

Figure 28:
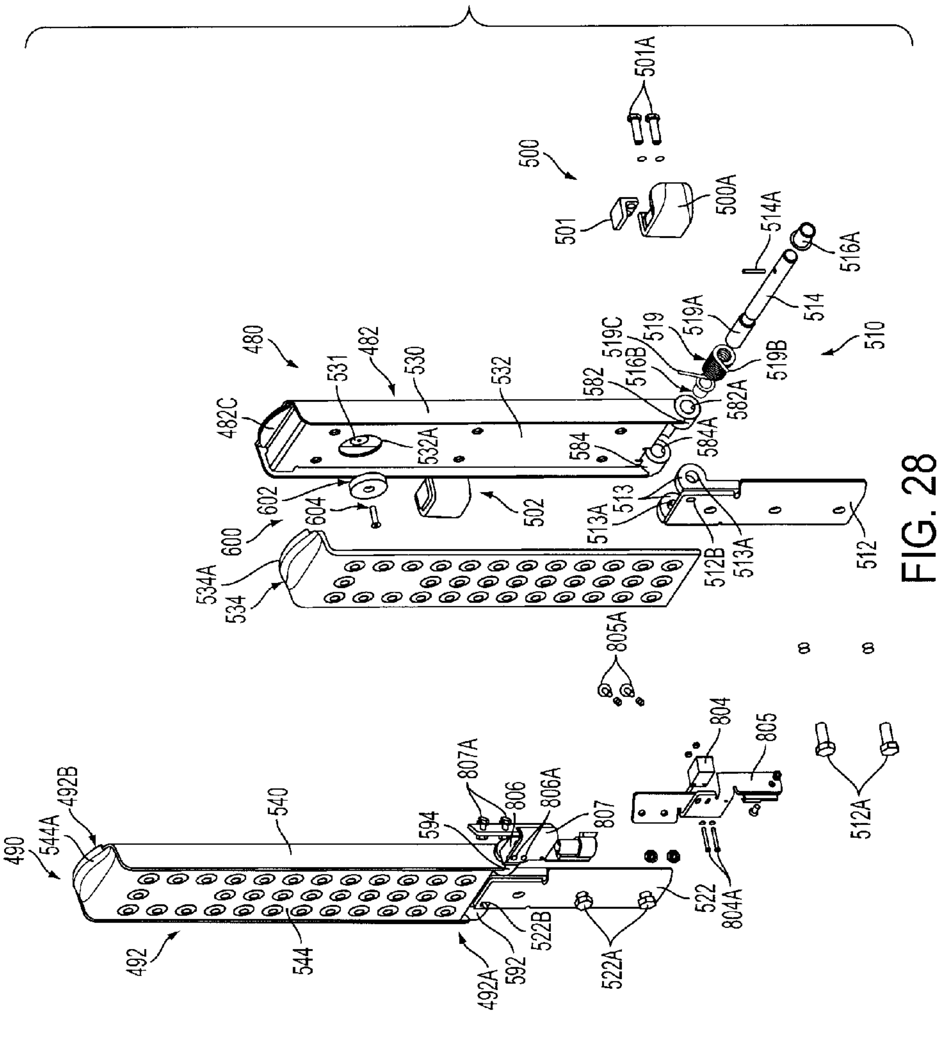
FIG. 28 is a perspective view of first and second step assemblies constructed in accordance with a second embodiment of the present invention.
Figure 29:
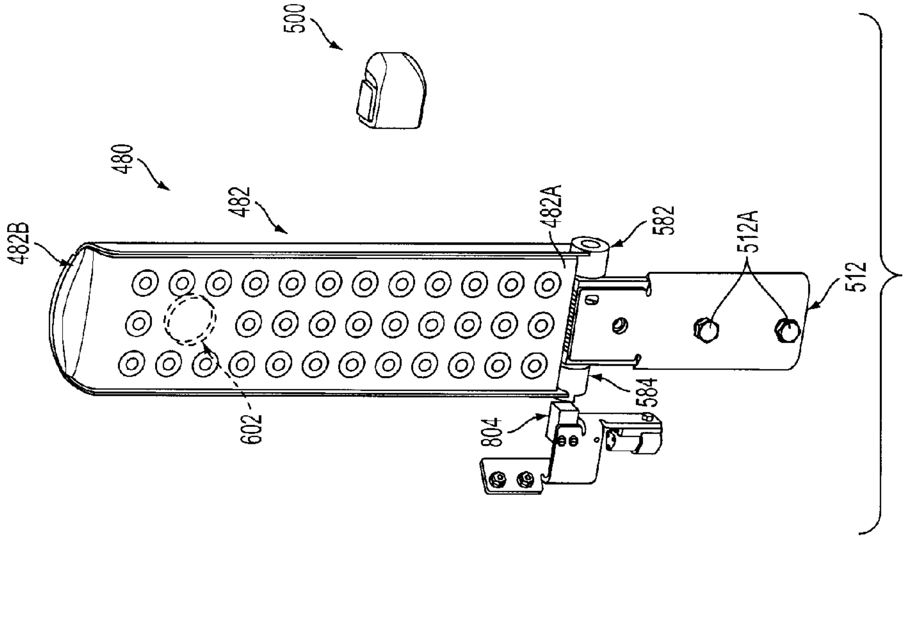

First and second step assemblies 480 and 490 and first and second stops 500 and 502 constructed in accordance with a second embodiment of the present invention are illustrated in FIG. 28. The first step assembly 480 comprises a first step 482, see FIGS. 28-30, capable of being pivoted between a deployed position where the step 482 is positioned across a first entrance of an operator compartment (not shown in FIGS. 28-30) and a stowed position where the first step 482 is positioned in a location so as not to block the first entrance into the operator compartment. The operator compartment may be defined by opposing first and second walls, such as the first and second opposing walls 62 and 64 illustrated in FIGS. 1-6. When in the deployed position, a second end 482B of the step 482, opposite a first end 482A of the step 482, engages or rests upon the stop 500. The stop 500 is bolted to or otherwise coupled to the first wall of the operator compartment at a location on the first wall such that the step 482 is located in a generally horizontal plane when deployed. When the first step 482 is in its deployed position, an operator may stand on the step 482 to gain access to an elevated storage location.

The second step assembly 490 comprises a second step 492, see FIG. 28, capable of being pivoted between a deployed positioned where the step 492 is positioned across a second entrance of the operator compartment and a stowed position where the second step 492 is positioned in a location so as not to block the second entrance into the operator compartment. When in the deployed position, a second end 492B of the step 492, opposite a first end 492A of the step 492, engages or rests upon the stop 502. The stop 502 is bolted to or otherwise coupled to the first wall of the operator compartment at a location on the first wall such that the step 492 is located in a generally horizontal plane. When the second step 492 is in its deployed position, an operator may stand on the step 492 to gain access to an elevated storage location.

Figure 31:
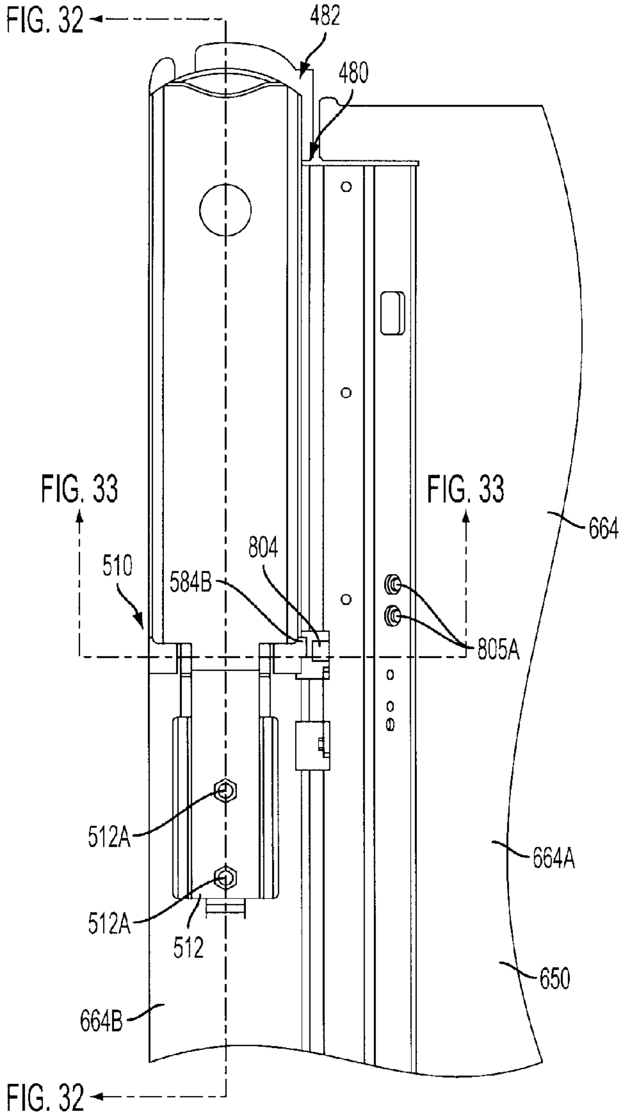
FIG. 31 is a view of the first step assembly coupled to a second wall of a materials handling vehicle.
Figure 32:
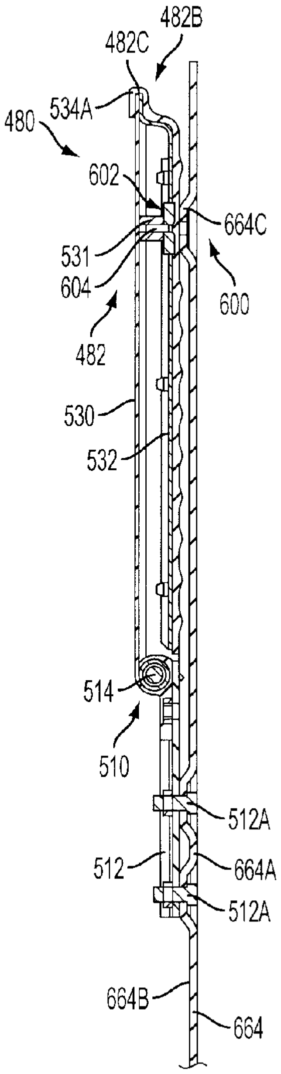
FIG. 32 is a view taken along view line 32-32 in FIG. 31.
Figure 34:
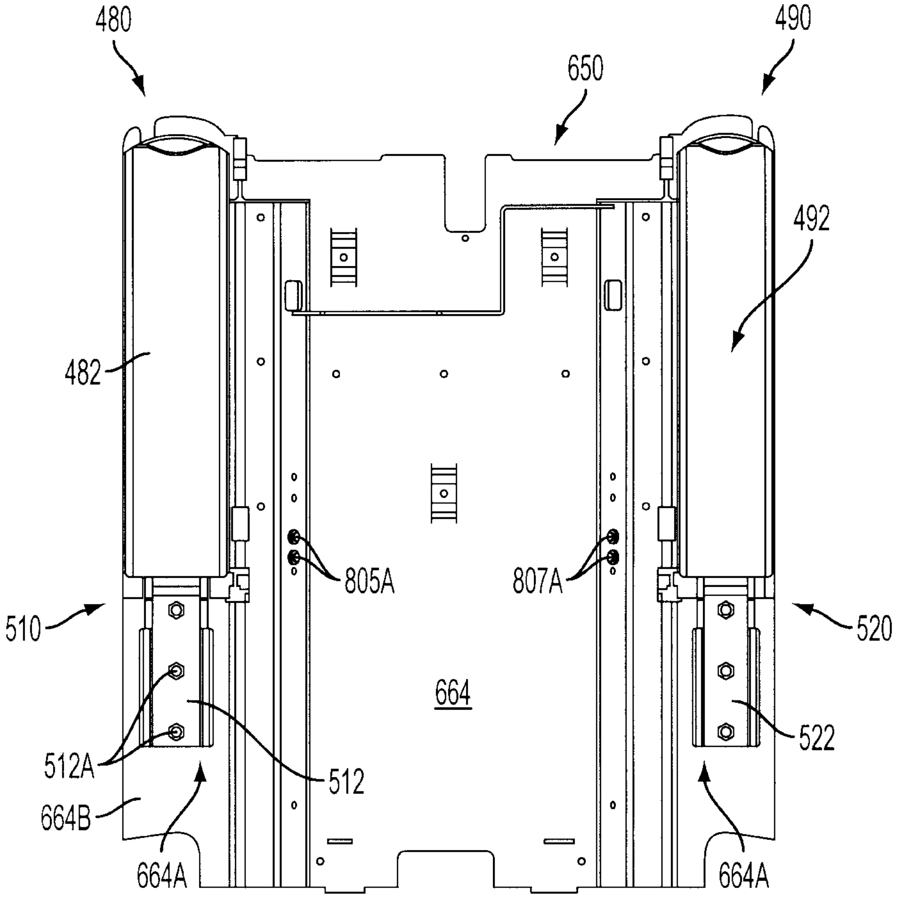
FIG. 34 is a view of the first and second step assemblies of FIG. 28 coupled to the second wall.

The first step assembly 480 further comprises a first hinge mechanism 510 for coupling the step 482 to a base portion 664A of the second wall 664 of the operator compartment, see FIGS. 31, 32 and 34. The second step assembly 490 further comprises a second hinge mechanism 520 for coupling the step 492 to the base portion 664A of the second wall 664, see FIG. 34. The second wall 664 defines one wall of a battery compartment 650.

The first step 482 comprises an outer channel 530 and an inner step plate 532, see FIG. 28, coupled together via one or more welds (not shown) located along outer edges of the step plate 532 and inner edges of the outer channel 530. A polymeric sheet or mat 534 formed, for example, from synthetic rubber, is positioned over the inner step plate 532 and comprises a gripping portion 534A extending over a tab 482C defined by ends of the outer channel 530 and the inner step plate 532, see FIGS. 28 and 32. The tab 482C and the gripping portion 534A define the second end 482B of the step 482. The gripping portion 534A, because it is formed from a sound absorbing polymeric material, functions to reduce sound which may be generated when the step 482 makes contact with the stop 500. The mat 534 may be coupled to the inner plate 532 and the tab 482C via adhesive, bolts or other like fastening mechanisms.

The first step 482 further comprises first and second connector arms 582 and 584, each provided with a bore 582A, 584A, see FIG. 28. The first and second connector arms 582 and 584 are coupled to the outer channel 530.

The first hinge mechanism 510 comprises a main attachment block 512 coupled via bolts 512A to an outer surface 664B of the base portion 664A of the second wall 664, see FIGS. 31, 32 and 34. The main attachment block 512 is provided with a pair of arms 513, each provided with a bore 513A, see FIG. 28. A pivot shaft 514 extends through the bores 582A, 584A in the first and second connector arms 582 and 584 of the first step 482 and the bores 513A in the arms 513 provided as part of the main attachment block 512, see FIGS. 28 and 33. A pin or a set screw 514A extends through the shaft 514 and is coupled to one of the main attachment block arms 513 so as to maintain the shaft 514 in position relative to the main attachment block 512.

Figure 33:
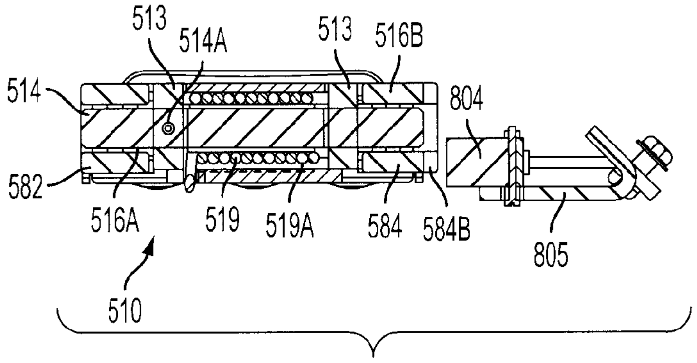
FIG. 33 is a view taken along view line 33 in FIG. 31 with the first step in its stowed position and without the second wall illustrated.

First and second of bushings 516A and 516B are positioned on the shaft 514 and extend through the bores 582A, 584A in the first and second connector arms 582, 584, see FIGS. 28 and 33. The bushings 516A, 516B permit the first and second connector arms 582, 584 and, hence, the step 482, to rotate relative to the shaft 514 and the main attachment block 512. A tube 519A is fitted over the shaft 514 and positioned between the first and second bushings 516A and 516B. A torsion spring 519 is positioned about the shaft 514 and the tube 519A, see FIGS. 28 and 33. A first end 519B of the torsion spring 519 is received in an opening 512B in the attachment block 512, while a second end 519C of the torsion spring 519 engages the step 482, see FIGS. 28 and 33A.

The first hinge mechanism 510 allows the first step 482 to pivot back and forth between its down or deployed position where the step 482 is positioned across the first entrance into the operator compartment and its up or stowed position, where the first step 482 is positioned in a location so as not to block the first entrance into the operator compartment. The spring 519 defines a biasing element for assisting an operator in moving the step 482 from its down or deployed position to its up or stowed position.

Figure 28A:
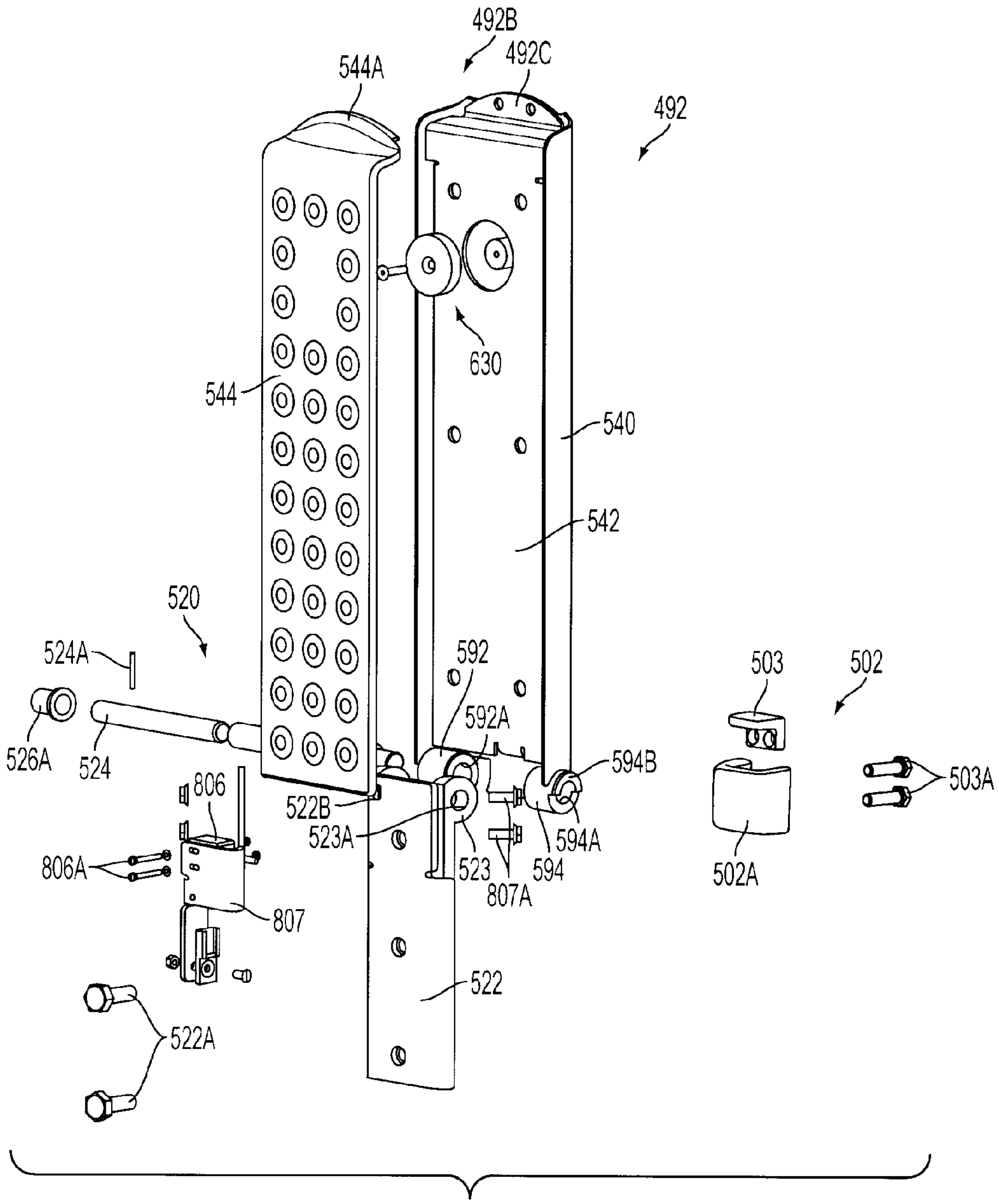
FIGS. 28A and 28B are exploded views of the second step assembly illustrated in FIG. 28.

The second step 492 comprises an outer channel 540 and an inner step plate 542, see FIGS. 28 and 28A, coupled together via one or more welds located along outer edges of the step plate 542 and inner edges of the outer channel 540. A polymeric sheet or mat 544 formed, for example, from synthetic rubber, is positioned over the inner step plate 542 and comprises a gripping portion 544A extending over a tab 492C defined by ends of the outer channel 540 and the inner step plate 542, see FIGS. 28, 28A and 28B. The tab 492C and the gripping portion 544A define the second end 492B of the step 492. The gripping portion 544A functions to reduce sound which may be generated when the step 492 makes contact with the stop 502. The mat 544 may be coupled to the inner plate 542 and the tab 492C via adhesive, bolts or other like fastening mechanisms.

The second step 492 further comprises first and second connector arms 592 and 594, each provided with a bore 592A, 594A, see FIG. 28A. The first and second connector arms 592 and 594 are coupled to the outer channel 540.

The second hinge mechanism 520 comprises a main attachment block 522 bolted via bolts 522A to the outer surface 664B of the base portion 664A of the second wall 664, see FIG. 34. The main attachment block 522 is provided with a pair of arms 523, each provided with a bore 523A, see FIGS. 28A and 28B. A pivot shaft 524 extends through the bores 592A, 594A in the first and second connector arms 592 and 594 of the second step 492 and the bores 523A in the arms 523 provided as part of the main attachment block 522. A pin or a set screw 524A extends through the shaft 524 and is coupled to one of the main attachment block arms 523 so as to maintain the shaft 524 in position relative to the main attachment block 522.

First and second of bushings 526A and 526B are positioned on the shaft 524 and extend through the bores 592A, 594A in the first and second connector arms 592, 594. The bushings 526A, 526B permit the first and second connector arms 592, 594 and, hence, the step 492, to rotate relative to the shaft 524 and the main attachment block 522. A tube 529A is fitted over the shaft 524 and positioned between the first and second bushings 526A and 526B. A torsion spring 529 is positioned about the shaft 524 and the tube 529A. A first end 529B of the torsion spring 529 is received in an opening 522B in the attachment block 522, while a second end 529C of the torsion spring 529 engages the step 492.

The second hinge mechanism 520 allows the second step 492 to pivot between its down or deployed position where the step 492 is positioned across the second entrance into the operator compartment and its up or stowed position, where the second step 492 is positioned in a location so as not to block the second entrance into the operator compartment. The spring 529 defines a biasing element for assisting an operator in moving the step 492 from its down or deployed position to its up or stowed position.

A first locking mechanism 600 is provided for releasably locking the first step 482 in its up or stowed position or its down or deployed position, see FIGS. 28 and 32. A second locking mechanism 630 is provided for releasably locking the second step 492 in its up or stowed position or is down or deployed position. The second locking mechanism 630 is constructed in the same manner as the first locking mechanism 600. Hence, only the first locking mechanism 600 will be described herein in detail. However, one skilled in the art will understand that the second locking mechanism 630 may be constructed in accordance with the description herein of the first locking mechanism 600.

The first locking mechanism 600 comprises a magnet 602 coupled via a bolt 604 to an extension 531 of the outer channel 530, see FIG. 32, and is positioned within an opening 532A in the inner step plate 532, see FIG. 28. The mat 534 covers the magnet 602. When the step 482 is positioned in its up or stowed position, the magnet 602 attracts to an opposing protruding section 664C of the second wall 664 so as to releasably hold the step 482 in its stowed position, see FIG. 32.

The stop 500 comprises a block 500A and a rubber stop element 501 secured to the block 500A via bolts 501A, see FIG. 28. When the step 482 is moved to its deployed position, the stop element 501 cushions a final impact of the step 482 with the stop 500. The stop 502 comprises a block 502A and a rubber stop element 503 secured to the block 502A via bolts 503A, see FIG. 28A. When the step 492 is moved to its deployed position, the stop element 503 cushions a final impact of the step 492 with the stop 502.

Figure 27A:
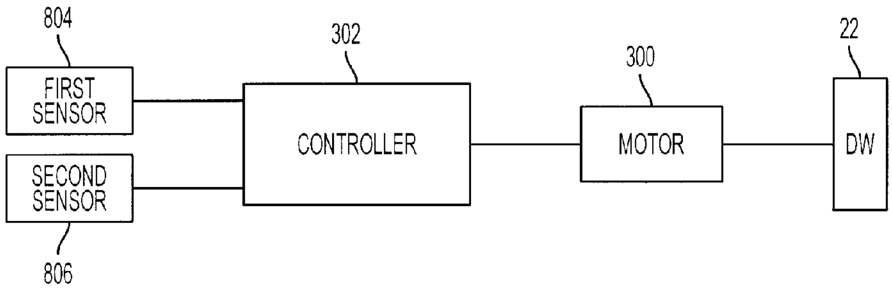
FIG. 27A is a schematic view of a vehicle drive wheel, a traction motor/brake assembly, a processor and first and second proximity sensors, all assembled in accordance with a second embodiment of the present invention.

As noted above, a traction motor/brake assembly 300 is coupled to the vehicle drive wheel 22 for driving and braking the drive wheel 22. A controller 302 controls the operation of the fraction motor/brake assembly 300, see FIG. 27A. In the second embodiment, the first and second sensors associated with the first and second steps 482 and 492, respectively, comprise first and second proximity sensors 804 and 806, see FIG. 27A. The sensors 804 and 806 are coupled to the controller 302. The first proximity sensor 804 is also coupled to a first holding bracket 805 via bolts 804A and the second proximity sensor 806 is coupled to a second holding bracket 807 via bolts 806A, see FIG. 28. The first holding bracket 805 is coupled to inner surface of the second wall 664 via bolts 805A and the second holding bracket 807 is coupled to the inner surface of the second wall 664 via bolts 807A, see FIG. 34. The inner surface of the second wall 664 is opposite the outer surface 664B, shown in FIG. 34.

Figure 30:
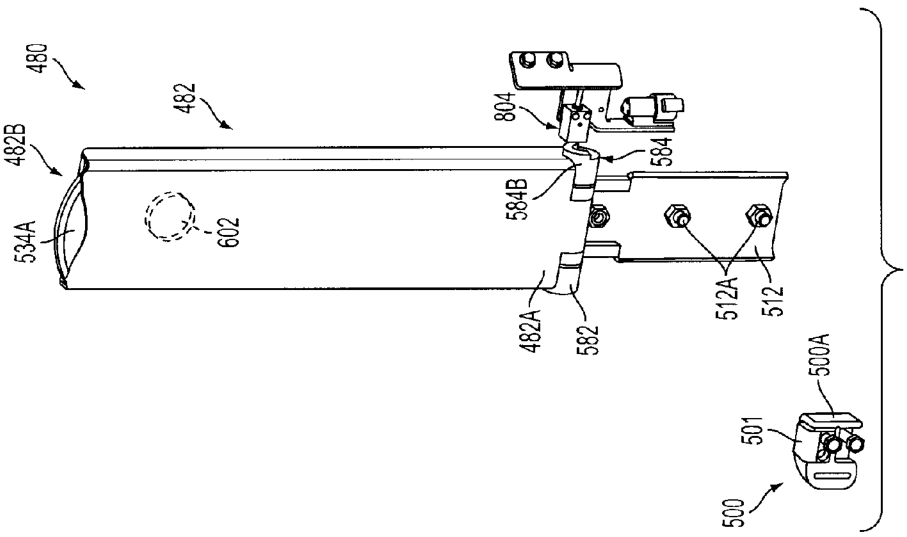
FIGS. 29 and 30 are perspective views of the first step assembly illustrated in FIG. 28.
Figure 33A:
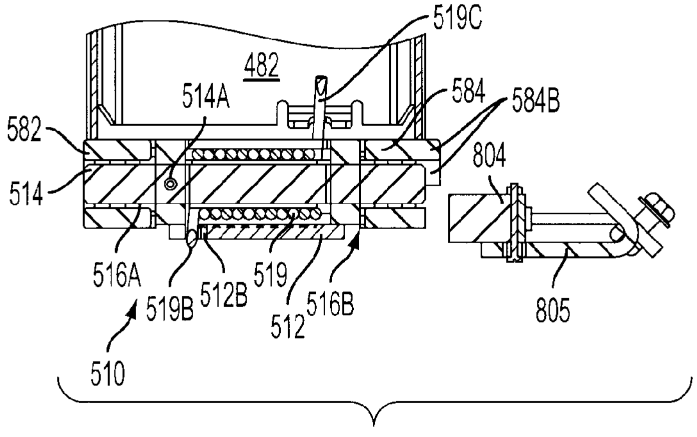
FIG. 33A is a view similar to FIG. 33 but with the first step in its deployed position.

The second connector arm 584 of the first step 482 comprises a flag 584B, see FIGS. 30, 33, 33A. When the first step 482 is located in its stowed position, see FIGS. 31, 32 and 33, the flag 584B is positioned directly across from the proximity sensor 804, causing the proximity sensor 804 to be actuated. When actuated, the proximity sensor 804 generates a signal to the controller 302 indicating that the first step 482 is in a travel state, i.e., the step 482 is in its stowed position in this illustrated embodiment. However, when the step 482 is rotated between about 1 and 10 degrees and preferably about 5 degrees from vertical, the flag 584B is rotated a sufficient amount to cause the proximity sensor 804 to be deactuated. When the proximity sensor 804 is deactuated, it generates a signal to the controller 302 that the first step 482 is no longer in a travel state. In FIG. 33A, the step 482 is shown in its deployed position where the flag 584B is positioned a sufficient distance away from the proximity sensor 804 such that the proximity sensor 804 is deactuated.

Figure 28B:
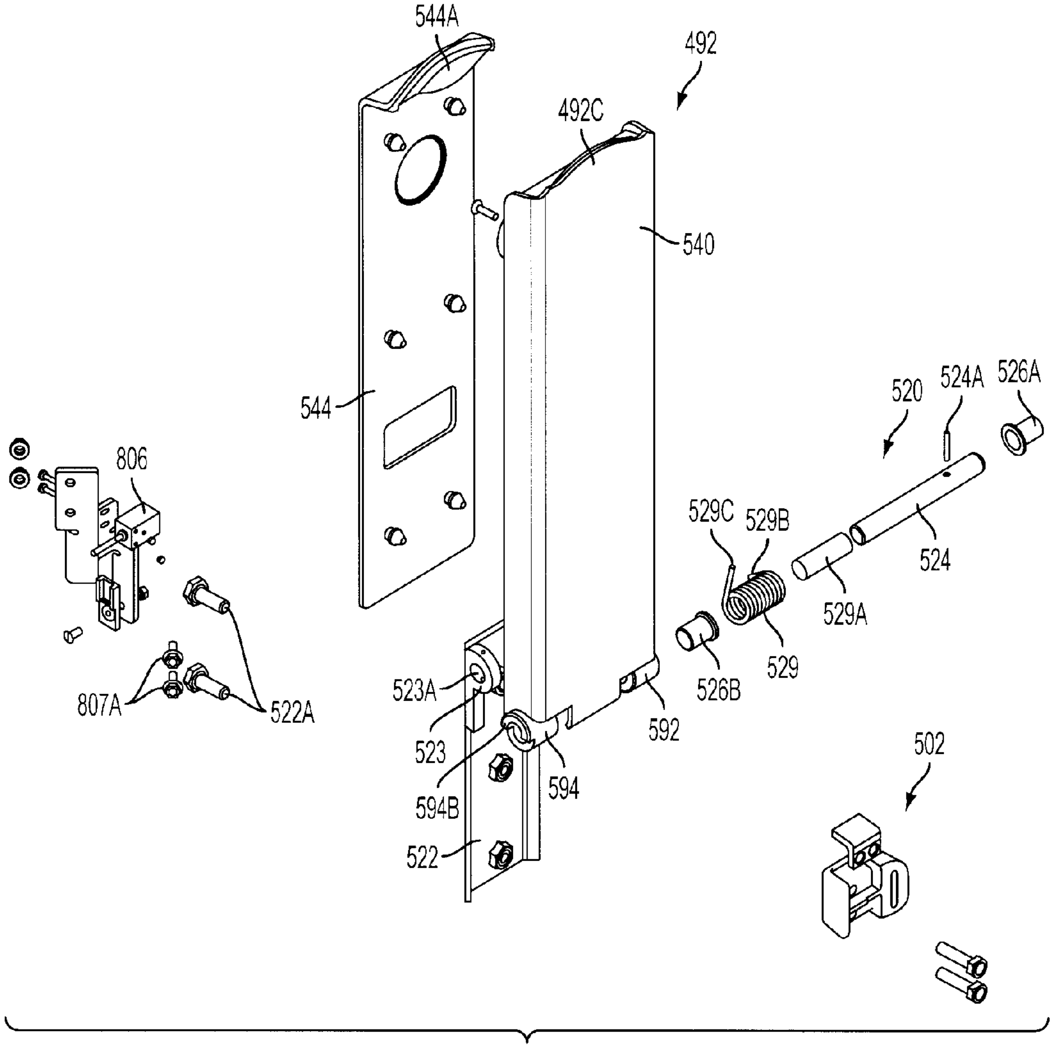

The second connector arm 594 of the second step 492 comprises a flag 594B, see FIGS. 28A and 28B. When the second step 492 is located in its stowed position, the flag 594B is positioned directly across from the proximity sensor 806, causing the proximity sensor 806 to be actuated. When actuated, the proximity sensor 806 generates a signal to the controller 302 indicating that the second step 492 is in a travel state, i.e., the step 492 is in its stowed position in this illustrated embodiment. However, when the step 492 is rotated between about 1 and 10 degrees and preferably about 5 degrees from vertical, the flag 594B is rotated a sufficient amount to cause the proximity sensor 806 to be deactuated. When the proximity sensor 806 is deactuated, it generates a signal to the controller 302 that the second step 492 is no longer in a travel state.

The controller 302, in response to operator commands, generates drive signals to the traction motor/brake assembly 300 to drive or effect rotation of the wheel 22 only when it receives signals from both the first and second proximity sensors 804 and 806 indicating that the steps 482 and 492 are in their travel states, i.e., are in their stowed positions in this illustrated embodiment. However, if the controller 302 receives a signal from the first proximity sensor 804 that the first step 482 is no longer in a travel state or a signal from the second proximity sensor 806 that the second step 492 is no longer in a travel state, the controller 302 does not generate a drive signal to the traction motor/brake assembly 300, i.e., the controller 302 will only permit the traction motor/brake assembly 300 to brake the wheel 22 but will not permit the traction motor/brake assembly 300 to effect rotation of the wheel 22. When the controller 302 receives a signal from the first proximity sensor 804 that the first step 482 is no longer in a travel state or a signal from the second proximity sensor 806 that the second step 492 is no longer in a travel state, it may be preferred for the controller 302 to cause the traction motor/brake assembly 300 to brake the wheel 22.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising:

a frame comprising an operator compartment having at least one entrance and a floorboard; and at least one step capable of being positioned across said entrance a spaced distance from said floorboard such that an operator may stand on said step when said step is positioned across said entrance to gain access to an elevated storage location; and wherein said step extends across the entire extent of said entrance when in a deployed position and is shaped so as to have a length extending in a longitudinal direction of the vehicle, a width and a height, wherein said width has a dimension greater than a dimension of said height.

2. The materials handling vehicle as set forth in claim 1, wherein said step is movable between the deployed position where said step is positioned across said entrance and a stowed position where said step is positioned in a location so as not to block said entrance into and exit from said operator compartment.

3. The materials handling vehicle as set forth in claim 2, further comprising at least one hinge mechanism coupled to said at least one step to allow said step to pivot between the deployed and stowed positions.

4. The materials handling vehicle as set forth in claim 3, wherein said step is in a down position when deployed and an up position when stowed and further comprising a biasing element for assisting an operator in moving said step from the down position to the up position.

5. The materials handling vehicle as set forth in claim 4, wherein said operator compartment further comprises first and second walls, and further comprising a stop coupled to said first wall, said step being pivotably coupled at a first end to said second wall, and a second end of said step engaging said stop when said step is moved to the down position, wherein said stop coupled to said first wall is spaced about the same distance from said floorboard as a location where said step is pivotably coupled to said second wall.

6. The materials handling vehicle as set forth in claim 5, further comprising a locking mechanism associated with said second wall for releasably locking said step when said step has been moved to the up position.

7. The materials handling vehicle as set forth in claim 2, further comprising:

a drive wheel coupled to said frame;

a motor coupled to said drive wheel for effecting rotation of said drive wheel;

a controller for controlling the operation of said drive motor; and at least one sensor associated with said step, said sensor generating a signal to said controller when said step is in a travel state, said controller providing a drive signal to said motor only when a travel state signal is being generated by said sensor.

8. The materials handling vehicle as set forth in claim 1, wherein said step is positioned above said floorboard a distance of from about 250 mm to about 450 mm.

9. The materials handling vehicle as set forth in claim 1, wherein said operator compartment comprises a walk-through operator compartment having first and second entrances, and said at least one step comprises first and second steps, said first step being adapted to be positioned across said first entrance a spaced distance from said floorboard and said second step being adapted to be positioned across said second entrance a spaced distance from said floorboard, wherein an operator may stand on one of said first and second steps when said one step is positioned across a corresponding one of said first and second entrances to gain access to the elevated storage location.

10. The materials handling vehicle as set forth in claim 9, wherein said first step is movable between a deployed position where said first step is positioned across said first entrance and a stowed position where said first step is positioned in a location so as not to block said first entrance into said operator compartment, and said second step is movable between a deployed position where said second step is positioned across said second entrance and a stowed position where said second step is positioned in a location so as not to block said second entrance into said operator compartment.

11. A materials handling vehicle comprising:

a frame comprising an operator compartment having at least one entrance and a floorboard;

a drive wheel coupled to said frame;

a motor coupled to said drive wheel for effecting rotation of said drive wheel;

a controller for controlling the operation of said motor;

at least one step associated with said frame capable of being moved between a deployed position so as to be positioned across said entrance a spaced distance from said floorboard to allow an operator to stand on said step and gain access to an elevated storage location and a stowed position where said step is stored in an out-of-the-way location at least one sensor associated with said step, said sensor generating a signal to said controller when said step is in a travel state, said controller providing a drive signal to said motor only when a travel state signal is being generated by said sensor; and wherein said step extends across the entire extent of said entrance when in the deployed position and is shaped so as to have a length extending in a longitudinal direction of the vehicle, a width and a height, wherein said width has a dimension greater than a dimension of said height.

12. The materials handling vehicle as set forth in claim 11, wherein said step slides between the deployed and stowed positions.

13. The materials handling vehicle as set forth in claim 11, further comprising at least one hinge mechanism coupled to said at least one step to allow said step to pivot between the deployed and stowed positions.

14. The materials handling vehicle as set forth in claim 13, wherein said step is in a down position when deployed and an up position when stowed and further comprising a biasing element for assisting an operator in moving said step from the down position to the up position.

15. The materials handling vehicle as set forth in claim 14, wherein said operator compartment further comprises first and second walls, and further comprising a stop coupled to said first wall, said step being pivotably coupled at a first end to said second wall, and a second end of said step engaging said stop when said step is moved to the down position, wherein said stop coupled to said first wall is spaced about the same distance from said floorboard as a location where said step is pivotably coupled to said second wall.

16. The materials handling vehicle as set forth in claim 15, further comprising a locking mechanism associated with said second wall for releasably locking said step when said step has been moved to the up position.

17. The materials handling vehicle as set forth in claim 11, wherein said step comprises a camming surface and said at least one sensor comprises a microswitch which is actuated by said camming surface.

18. The materials handling vehicle as set forth in claim 11, wherein said at least one step comprises first and second steps, said first step being adapted to be moved between a deployed position to allow an operator to stand on said first step and gain access to an elevated storage location and a stowed position where said first step is stored in an out-of-the-way location, and said second step being adapted to be moved between a deployed position to allow an operator to stand on said second step and gain access to an elevated storage location and a stowed position where said second step is stored in an out-of-the-way location.

19. The materials handling vehicle as set forth in claim 11, wherein said step comprises a flag and said at least one sensor comprises a proximity sensor which is actuated by said flag.

20. The materials handling vehicle as set forth in claim 1, wherein said frame further comprises at least one fork.

21. The materials handling vehicle as set forth in claim 11, wherein said frame further comprises at least one fork.

* * * * *